US008649955B2

(12) United States Patent
Ikeda et al.

(10) Patent No.: US 8,649,955 B2

(45) Date of Patent: Feb. 11, 2014

(54) ENGINE CONTROL SYSTEM WITH ALGORITHM FOR ACTUATOR CONTROL

(75) Inventors: Sumitaka Ikeda, Anjo (JP); Koji Ishizuka, Aichi-ken (JP); Yoshimitsu Takashima, Anjo (JP); Satoru Sasaki, Kariya (JP); Kazuhiro Higuchi, Ichinomiya (JP); Youhei Morimoto, Kariya (JP); Mitsuhiro Nishimura, Chiryu (JP); Masahiro Asano, Kariya (JP)

(73) Assignee: Denso Corporation, Kariya (JP)

( * ) Notice: Subject to any disclaimer, the term of this patent is extended or adjusted under 35 U.S.C. 154(b) by 411 days.

(21) Appl. No.: 12/916,868

(22) Filed: Nov. 1, 2010

(65) Prior Publication Data

US 2011/0106398 A1 May 5, 2011

(30) Foreign Application Priority Data

Nov. 2, 2009 (JP) ................................ 2009-251865

(51) Int. Cl.
*G06F 17/21* (2006.01)

(52) U.S. Cl.
USPC ........................................................ 701/102

(58) Field of Classification Search
USPC ............... 123/339.1, 339.12, 339.16, 339.17, 123/339.18, 434, 478, 486, 568.21, 679; 701/102–105, 109, 115
See application file for complete search history.

(56) References Cited

U.S. PATENT DOCUMENTS

| | | | | |
|---|---|---|---|---|
| 6,928,361 | B2 | 8/2005 | Nakayama et al. | |
| 6,994,077 | B2 | 2/2006 | Kobayashi et al. | |
| 7,163,007 | B2 | 1/2007 | Sasaki et al. | |
| 7,258,106 | B2 * | 8/2007 | Yamaguchi et al. .......... | 123/434 |
| 2008/0228383 | A1 | 9/2008 | Nakagawa et al. | |

FOREIGN PATENT DOCUMENTS

| | | |
|---|---|---|
| CN | 1478198 | 2/2004 |
| CN | 1682025 | 10/2005 |
| JP | 2002-138889 | 5/2002 |
| JP | 2002-155783 | 5/2002 |
| JP | 2005-248703 | 9/2005 |

(Continued)

OTHER PUBLICATIONS

Japanese Office Action dated Aug. 30, 2011, issued in corresponding Japanese Application No. 2009-251865 with English Translation.

(Continued)

*Primary Examiner* — Stephen K Cronin
*Assistant Examiner* — Elizabeth Hadley
(74) *Attorney, Agent, or Firm* — Nixon & Vanderhye PC

(57) ABSTRACT

An engine control apparatus which may be employed in automotive vehicles. The engine control apparatus is equipped with at least one of a combustion parameter or a controlled variable arithmetic expression. The combustion parameter arithmetic expression defines combustion conditions of the engine needed to achieve required values of engine output-related values such as exhaust emissions. The controlled variable arithmetic expression defines how to operate actuators for an operation of the engine to meet desired combustion conditions of the engine. The use of the combustion parameter or controlled variable arithmetic expression achieves simultaneous agreement of the engine output-related values with required values without mutual interference between combustion parameters associated with the combustion conditions. The engine control apparatus also works to correct target values of fuel injection-related combustion parameters based on a response delay of an air-related combustion parameter, thereby ensuring the accuracy in achieving required values of the engine output-related values.

2 Claims, 10 Drawing Sheets

(56) References Cited

FOREIGN PATENT DOCUMENTS

| | | |
|---|---|---|
| JP | 2006-029171 | 2/2006 |
| JP | 2007-077935 | 3/2007 |
| JP | 2008-223643 | 9/2008 |
| JP | 2009-156034 | 7/2009 |

OTHER PUBLICATIONS

Office Action (8 pages) dated Feb. 18, 2013 issued in corresponding Chinese Application No. 201010534382.8 and English translation (7 pages).

* cited by examiner

ENGINE CONTROL SYSTEM WITH ALGORITHM FOR ACTUATOR CONTROL

CROSS REFERENCE TO RELATED DOCUMENT

The present application claims the benefit of priority of Japanese Patent Application No. 2009-251865 filed on Nov. 2, 2009, the disclosures of which are incorporated herein by reference.

BACKGROUND OF THE INVENTION

1. Technical Field of the Invention

The present invention relates generally to an engine control system which may be employed in automotive vehicles and is designed to use an algorithm to control operations of actuators such as a fuel injector and an EGR (Exhaust Gas Recirculation) valve to regulate a combustion condition of fuel in an internal combustion engine and also to control output characteristics of the engine.

2. Background Art

Engine control systems are known which determine controlled variables such as the quantity of fuel to be injected into an engine (which will also be referred to as an injection quantity), the injection timing, the amount of a portion of exhaust gas to be returned back to the inlet of the engine (which will also be referred to as an EGR amount below), the boost pressure, the amount of intake air, the ignition timing, and an open/close timing of intake and exhaust valves to bring an engine output-related value such as the amount of exhaust emissions, for example, NOx or CO, the torque outputted by the engine, or the specific fuel consumption (or fuel efficiency) into agreement with a required value.

Most of the engine control systems are equipped with a control map which stores optimum values of, for example, a target quantity of fuel to be injected into the engine for respective required engine output-related values. The control map is usually made by adaptability tests performed by an engine manufacturer. The engine control systems work to calculate the controlled variable needed to meet the required engine output-related value using the control map and output a command signal to a corresponding actuator to achieve the controlled variable.

The making of the control map usually requires a huge number of adaptability tests, so that the adaptability tests consume a significant amount of time in total. The adaptability test work and map-making work, therefore, impose a heavy burden on control is system manufacturers. Particularly, when the control map is made with respect to each of environmental conditions such as the temperature of engine coolant and the outdoor air temperature, it requires a large number of adaptability tests which will constitute a great burden on the control system manufacturers.

The adaptability tests are usually performed for each of the different engine output-related values. This is likely to result in interference between the different types of controlled variables in that when one of the engine output-related values reaches its required value, another engine output-related value deviates from its required value, while when the another engine output-related value is brought to the required value, the previously mentioned one of the engine output-related values deviates from the required one. It is, therefore, very difficult to bring the different types of engine output-related values into agreement with target values simultaneously.

Japanese Patent First Publication Nos. 2008-223643 and 2007-77935 disclose engine control systems which calculate a target value of pressure in a cylinder of the engine (i.e., a combustion parameter) based on a value of torque the engine is required to output and adjust the open/close timing of the intake and exhaust valves and the quantity of fuel to be injected into the engine (i.e., controlled variables of actuators) so as to bring the in-cylinder pressure into agreement with the target value.

The above engine control systems, however, also need to experimentally sample optimum values of the in-cylinder pressure for respective required values of output torque of the engine through the adaptability tests to make the control map, which will consume lots of time. The engine control systems also face the problem on the interference between the different types of controlled variables in that when an actual output torque of the engine reaches a required value, another engine output-related value such as the amount of NOx deviates from a target value, while when the another engine output-related value reaches the target value, the actual output torque deviates from the required value. It is, thus, difficult to bring the different types of engine output-related values into agreement with target values simultaneously. We also found a difficulty in bringing actual values of the engine output-related values into agreement with required values accurately depending upon operation conditions of the engine.

SUMMARY OF THE INVENTION

It is therefore an object of the invention to provide an engine control apparatus constructed to decrease a burden on the adaptability test work and map-making work and improve the controllability in bringing a plurality of engine output-related values into agreement with required or target ones simultaneously and accurately.

According to one aspect of the invention, there is provided an engine control apparatus which may be employed in automotive vehicles. The engine control apparatus comprises: (a) a storage device which stores therein a combustion parameter arithmetic expression defining correlations between a plurality of types of engine output-related values associated with output characteristics of an internal combustion engine and a plurality of types of combustion parameters associated with combustion conditions of the internal combustion engine, the combustion parameters being broken down into a plurality of fuel injection-related combustion parameters which change depending upon a condition of injection of fuel into the internal combustion engine and at least one air-related combustion parameter which changes depending upon an air condition in the internal combustion engine; (b) a combustion target value calculator which uses the combustion parameter arithmetic expression, as stored in the storage device, to calculate a combination of target values of the combustion parameters which correspond to required values of the engine output-related values; (c) a controlled variable command value calculator which calculates command values based on the combination of the target values of the combustion parameters, as derived by the combustion target value calculator, the command values being provided to adjust controlled variables of actuators which work to control the combustion conditions of the internal combustion engine for achieving desired values of the output characteristics of the internal combustion engine; and (d) a fuel injection-related combustion parameter corrector installed in the combustion target value calculator. The fuel injection-related combustion parameter corrector works to correct the target values of the fuel injection-related combustion parameters based on a response delay in change in an actual value of the air-related combustion parameter to a change in target value thereof.

The storage device, the combustion target value calculator, acid the controlled variable command value calculator offer the following advantages.

The combustion parameter arithmetic expression, as described above, defines the correlations between the engine output-related values and the combustion parameters. The agreement of actual values of the engine output-related values with required values thereof may, therefore, be achieved by bringing the combustion conditions of the internal combustion engine toward values of the combustion parameters, as derived by substituting the required values of the engine output-related values into the combustion parameter arithmetic expression. In other words, the combustion parameter arithmetic expression describes relationships of the combustion conditions in which the internal combustion engine is to be placed to the engine output-related values. The required values of the engine output-related values are, therefore, achieved by determining values calculated from the combustion parameter arithmetic expression as the target values of the combustion parameters and controlling operations of the actuators to meet the target values. The combustion parameter arithmetic expression may be implemented by a determinant, as illustrated in FIG. 1(*b*), or a model, as illustrated in FIG. 1(*a*).

The combustion parameter arithmetic expression may define the correlations between, for example, the amount of NOx, the amount of PM (Particulate Matter), the output torque of the engine, etc. (i.e. the engine output-related values) and, for example, the ignition timing, the ignition delay, etc. (i.e., the combustion parameters). In other words, the combustion parameter arithmetic expression does not define a one-to-one correspondence between the engine output and the ignition timing, but defines a combination of values of the ignition timing and the ignition delay which are needed to meet the required values of all the output torque, the amount of NOx, and the amount of PM.

Basically, the combustion parameter arithmetic expression is made to define a given number of or all possible combinations of the combustion parameters (e.g., the ignition timing and the ignition delay) with the engine output-related values (e.g., the output torque, the amount of NOx, and the amount of PM) which are needed to achieve the required values of the engine output-related values.

The engine control apparatus of the invention, as described above, works to use the combustion parameter arithmetic expression to calculate a combination of target values of the combustion parameters which correspond to required values of the engine output-related values and calculate the command values for the actuators which are required to meet the combination of the target values. This eliminates, unlike in the publications, as referred to in the introductory part of this application, the need for finding relations of optimum values of the combustion parameters to the engine output-related values through the adaptability tests, thus decreasing a burden of the adaptability test work and the map-making work on manufacturers of the engine control apparatus.

If target values of the combustion parameters in relation to the engine output-related values are determined independently of each other, it may result in the following mutual interference. Specifically, when one of the engine output-related values which corresponds to the target value of one of the combustion parameters reaches its required value, another engine output-related value deviates from its required value, while when another engine output-related value is brought into agreement with its required value, the previously mentioned one of the engine output-related values deviates from its required value. It is, therefore, very difficult to bring the different types of engine output-related values into agreement with target values simultaneously. In contrast, the engine control apparatus of this invention calculates a combination of target values of the combustion parameters which correspond to required values of the engine output-related values and controls the operations of the actuators so as to achieve the target values, thus avoiding the deterioration of the controllability arising from the mutual interference between the combustion parameters and attaining the simultaneous agreement of the engine output-related values with the required values thereof, which results in an improvement of the controllability of the engine control apparatus.

The fuel injection-related combustion parameter corrector provides the following advantages.

The response of a change in actual value of the air-related combustion parameter to a change in target value thereof is slower than that of the fuel injection-related combustion parameters. Thus, when a most recently measured value of the air-related combustion parameter is decided in error to have already agreed with a latest target value thereof, as derived in a previous control cycle, in calculation of a target value of the air-related combustion parameter through the combustion parameter arithmetic expression for use in this control cycle, it may lead to great deviations of actual values of the engine output-related values from required values thereof.

In order to alleviate the above problem, the engine control apparatus is designed to correct the target values of the fuel injection-related combustion parameters based on a lag in response of the actual value of the air-related combustion parameter to a change in, target value thereof, especially when the target values of the combustion parameters are changing during a transient operation of the engine, thereby minimizing an error in agreement of the actual values of the engine output-related values with the target values thereof.

In the preferred mode of the invention, the storage device may store therein a fuel injection-related correction arithmetic expression which defines correlations between correction amounts that are amounts by which the fuel injection-related combustion parameters are to be corrected and the response delay. The fuel injection-related combustion parameter corrector may calculate the correction amounts for the target values of the fuel injection-related combustion parameters based on the response delay using the fuel injection-related correction arithmetic expression. This facilitates the ease of determining amounts by which the fuel injection-related combustion parameters are to be corrected to compensate for the response delay.

The fuel injection-related combustion parameter corrector may correct the target values of all the fuel injection-related combustion parameters using a single correction factor. This results in a decrease in load on calculation of the correction amounts as compared with when the correction amounts are determined one for each of the fuel injection-related combustion parameters.

The storage device may also store therein a controlled variable arithmetic expression defining correlations between the combustion parameters and the controlled variables. The controlled variable command value calculator may use the controlled variable arithmetic expression to calculate a combination of the command values for the controlled variables which correspond to the target values of the combustion parameters.

The controlled variable arithmetic expression, as described above, defines the correlations between the combustion parameters and the controlled variables of the actuators. The agreement of actual values of the combustion parameters with target values thereof may, therefore, be achieved by controlling the operations of the actuators to achieve the required values of the controlled variables, as derived by substituting the target values of the combustion parameters into the controlled variable arithmetic expression. In other words, the controlled variable arithmetic expression expresses how to operate the actuators to meet desired combustion conditions of the engine. The target values of the combustion parameters are, therefore, achieved by deter mining the command values based on values calculated from the controlled variable arithmetic expression and outputting the command values to the actuators. The controlled variable arithmetic expression may be implemented by a determinant, as illustrated in FIG. 1(*c*), or a model, as illustrated in FIG. 1(*a*).

The engine control apparatus may, therefore, also work to use the combustion parameter arithmetic expression and the controlled variable arithmetic expression to define the correlations between the engine output-related values and the combustion parameters and between the combustion parameters and the controlled variables, thereby figuring out how to operate the actuators to derive desired combustion conditions of the engine and finding the combustion conditions in relation to the output conditions of the engine. This means that the combustion parameters are used as intermediate parameters to obtain the correlations between the engine output-related values and the controlled variables.

The simultaneous agreement of the engine output-related values with the required values thereof is, therefore, achieved by calculating target values of the combustion parameters based on required values of the engine output-related values through the combustion parameter arithmetic expression, producing command values for the controlled variables which correspond to the calculated target values through the controlled variable arithmetic expression, and controlling the operations of the actuators through the command values.

The engine control apparatus may further include an engine output feedback control circuit which feeds deviations of actual or calculated values of the engine output-related values from the required values thereof back to calculation of the target values of the combustion parameters. The actual values of the engine output-related values may be measured directly by sensors. The calculated values of the engine output-related values may be derived by models.

The correlations of the combustion conditions (i.e., the combustion parameters) to the output conditions (i.e., engine output-related values) of the engine will change with a change in environmental condition such as the temperature of coolant of the engine or the outside air temperature. The correction of the target values, as derived by the combustion parameter arithmetic expression for each environmental condition, requires the adaptability tests to predetermine amounts by which the target values are to be corrected. This results in an increase in burden of the adaptability test work and the map-making work on the manufacturers.

In order to avoid the above drawback, the engine control apparatus of the invention calculates the target values of the combustion parameters so as to eliminate the deviations of the actual or calculated values of the engine output-related values from the required values thereof in the feedback mode, so that the target values are derived which accommodate the change in environmental condition. This eliminates the need for the adaptability tests to find the amounts of correction, thus resulting in a decrease in burden of the adaptability test work and the reap-malting work on the manufacturers.

The engine control apparatus may further include a combustion parameter feedback control circuit which feeds deviations of actual or calculated values of the combustion parameters from the target values thereof back to calculation of the command values for the controlled variables. The actual values of the combustion parameters may be measured directly by sensors. The calculated values of the combustion parameters may be derived by models.

The correlations between the combustion parameters and the controlled variables which show how to operate the actuators to meet desired combustion conditions of the engine will change with a change in environmental condition such as the temperature of coolant of the engine or the outside air temperature. The correction of the command values, as derived by the controlled variable arithmetic expression for each environmental condition, requires the adaptability tests to predetermine amounts by which the corarnand values are to be corrected. This results in an increase in burden of the adaptability test work and the map-making work on the manufacturers.

In order to avoid the above drawback, the engine control apparatus calculates the command values for the controlled variables so as to eliminate the deviations of the actual or calculated values of the combustion parameters from the target values thereof in the feedback mode, so that the command values are derived which accommodate the change in environmental condition. This eliminates the need for the adaptability tests to find the amounts of correction, thus resulting in a decrease in burden of the adaptability test work and the map-making work on the manufacturers.

For example, the air-related combustion parameter is at least one of the quantity of air in the cylinder of the engine, the concentration of oxygen ($O_2$) in the cylinder of the engine, the temperature in the cylinder of the engine, the pressure in the cylinder of the engine, etc. Such air-related combustion parameters change slightly depending upon the condition of fuel injected into the engine, but are heavily dependent upon the condition of air in the engine.

For example, the fuel injection-related combustion parameters are an ignition timing and an ignition delay that is the time required between when the fuel starts to be sprayed and when the fuel starts to be ignited, etc. Such fuel injection-related combustion parameters change slightly depending upon the condition of air in the engine, but are heavily dependent upon the condition of fuel injected into the engine.

The engine output-related values represent at least two of a physical quantity associated with an exhaust emission from the internal combustion engine, a physical quantity associated with an output torque of the internal combustion engine, a physical quantity associated with a fuel consumption, and a physical quantity associated with combustion noise of the internal combustion engine.

For instance, the physical quantity associated with the exhaust emission is the amount of NOx, the amount of PM, the amount of CO, or the amount of HC. The physical quantity associated with the output torque of the engine is the torque outputted from the engine itself or the speed of the engine. The physical quantity associated with the combustion noise is a combustion noise itself or mechanical vibrations of the engine. Such various kinds of physical quantities may be exemplified as the engine output-related values and broken down roughly into the exhaust emission, the output torque, the fuel consumption, and the combustion noise. These four kinds of engine output-related values are disposed to interfere with each other. The engine control apparatus is, therefore, very effective in treating such engine output-related values.

The engine output-related values may also include at least two of the amount of NOx, the amount of PM, the amount of CO, and the amount of HC. The engine output-related values associated with such exhaust emissions are more likely to have the tradeoff relationship. The engine control apparatus is, therefore, effective in treating such engine output-related values.

The controlled variables may include at least two of the injection quantity of fuel, the injection timing of fuel, the number of injections of fuel, the supply pressure of fuel, the EGR amount, the supercharging pressure, and the open/close timing of intake or exhaust valve. Such controlled variables are typical variables used in the engine control system and more likely to interfere mutually with each other. The use of the controlled variable arithmetic expression, therefore, minimizes the mutual interference between such controlled variables.

According to the second aspect of the invention, there is provided an engine control apparatus which comprises: (a) a combustion target value calculator which calculates target values of combustion parameters associated with combustion conditions of an internal combustion engine based on engine output-related values indicating output characteristics of the internal combustion engine, the combustion parameters being broken down into a plurality of fuel injection-related combustion parameters which change depending upon a condition of injection of fuel into the internal combustion engine and at least one air-related combustion parameter which changes depending upon an air condition in the internal combustion engine; (b) a storage device which stores therein a controlled variable arithmetic expression defining correlations between the combustion parameters and controlled variables of actuators which work to control combustion conditions of the internal combustion engine, the controlled variables being broken down into a plurality of fuel injection-related controlled variables which affect a condition of injection of fuel into a cylinder of the internal combustion engine and at least one air-related controlled variable which affects a condition of air in the cylinder of the internal combustion engine; (c) a controlled variable command value calculator which uses the controlled variable arithmetic expression, as stored in the storage device, to calculate a combination of command values which correspond to the target values of the combustion parameters, the command values being provided to adjust the controlled variables of the actuators for achieving desired values of the output characteristics of the internal combustion engine; and (d) a fuel injection-related controlled variable corrector installed in the controlled variable command value calculator. The fuel injection-related controlled variable corrector works to correct the command values for the fuel injection-related controlled variables based on a response delay in change in an actual value of the air-related combustion parameter to a change in target value thereof.

The controlled variable arithmetic expression, as described above, defines the correlations between the combustion parameters and the controlled variables of the actuators. The agreement of actual values of the combustion parameters with target values thereof may, therefore, be achieved by controlling the operations of the actuators to achieve the required values of the controlled variables, as derived by substituting the target values of the combustion parameters into the controlled variable arithmetic expression. In other words, the controlled variable arithmetic expression expresses how to operate the actuators to meet desired combustion conditions of the engine. The target values of the combustion parameters are, therefore, met by determining the command values based on values calculated from the controlled variable arithmetic expression and outputting the command values to the actuators. The controlled variable arithmetic expression may be implemented by a determinant, as illustrated in FIG. 1(*c*), or a model, as illustrated in FIG. 1(*a*).

The controlled variable arithmetic expression may define the correlations of the ignition timing, the ignition delay, etc., (i.e., the combustion parameters) and the injection quantity, the EGR amount, the supercharging pressure, etc. (i.e., the controlled variables). In other words, the controlled variable arithmetic expression does not define a one-to-one correspondence between, for example, the ignition timing and the injection quantity, but shows how to select a combination of, for example, the injection quantity, the EGR amount, and the supercharging pressure to meet all the target values of the ignition timing and the ignition delay.

Basically, the controlled variable arithmetic expression is made to define a given number or all possible combinations of the controlled variables with the combustion parameters which are needed to achieve the target values of the combustion parameters.

The engine control apparatus, as described above, works to use the controlled variable arithmetic expression to calculate a combination of the command values for the controlled variables which corresponds to target values of the combustion parameters, thus eliminating the need for finding relations of optimum values of the controlled variables to the combustion parameters through the adaptability tests, which results in a decrease in burden of the adaptability test work and the map-making work on manufacturers.

If the command values for the controlled variables in relation to the combustion parameters are determined independently of each other, it may result in the following mutual interference. Specifically, when one of the combustion parameters which corresponds to the command value for one of the controlled variables has reached a target value thereof, another combustion parameter deviates from a target value thereof, while when the another combustion parameter is brought into agreement with the target value thereof, the one of the combustion parameters deviates from the target value thereof. In contrast, the engine control apparatus calculates a combination of the command values for the controlled variables which correspond to target values of the combustion parameters and controls the operation of the actuators based on the combination of the command values, thus avoiding the deterioration of the controllability arising from the mutual interference between the combustion parameters and attaining the simultaneous agreement of the combustion parameters with the target values thereof, which results in an improvement of the controllability of the engine control apparatus.

The fuel injection-related controlled variable corrector provides the following advantages.

The response of a change in actual value of the air-related combustion parameter to a change in target value thereof is slower than that of the fuel injection-related combustion parameters. Thus, when a most recently measured value of the air-related combustion parameter is decided in error to have already agreed with a latest target value thereof, as derived in a previous control cycle, in calculation of a target value of the air-related combustion parameter through the combustion parameter arithmetic expression for use in this control cycle, it may lead to great deviations of actual values of the engine output-related values from required values thereof.

In order to alleviate the above problem, the engine control apparatus is designed to correct the command values for the fuel injection-related controlled variables based on a lag in response of the actual value of the air-related combustion parameter to a change in target value thereof, especially when the target values of the combustion parameters are changing during a transient operation of the engine, thereby minimizing an error in agreement of the actual values of the engine output-related values with the target values thereof.

In the preferred mode of the invention, the storage device may store therein a controlled variable correction arithmetic expression which defines correlations between correction amounts that are amounts by which the fuel injection-related controlled variables are to be corrected and the response delay. The fuel injection-related controlled variable corrector calculates the correction amounts for the command values for the fuel injection-related controlled variables based on the response delay using the controlled variable correction arithmetic expression. This facilitates the ease of determining amounts by which the fuel injection-related controlled variables are to be corrected to compensate for the response delay.

The fuel injection-related controlled variable corrector may correct the command values for all the fuel injection-related controlled variables using a single correction factor. This results in a decrease in load on calculation of the correction amounts as compared with when the correction amounts are determined one for each of the fuel injection-related combustion parameters.

The storage device may also store therein a combustion parameter arithmetic expression defining correlations between the engine output-related values and the combustion parameters. The controlled variable command value calculator uses the combustion parameter arithmetic expression to calculate a combination of the target values of the combustion parameters which correspond to the required values of the engine output-related values.

The engine control apparatus, as described above, works to use the combustion parameter arithmetic expression to calculate the combination of target values of the combustion parameters which correspond to the required values of the engine output-related values and calculate the command values for the actuators which are required to meet the combination of the target values. This eliminates, unlike in the publications, as referred to in the introductory part of this application, the need for finding relations of optimum values of the combustion parameters to the engine output-related values through the adaptability tests, thus decreasing a burden of the adaptability test work and the map-making work on manufacturers of the engine control apparatus.

The engine control apparatus calculates the combination of target values of the combustion parameters which correspond to the required values of the engine output-related values and controls the operations of the actuators so as to achieve the target values, thus avoiding the deterioration of the controllability arising from the mutual interference between the combustion parameters and attaining the simultaneous agreement of the engine output-related values with the required values thereof, which results in an improvement of the controllability of the engine control apparatus.

The engine control apparatus also works to use the combustion parameter arithmetic expression and the controlled variable arithmetic expression to define the correlations between the engine output-related values and the combustion parameters and between the combustion parameters and the controlled variables, thereby figuring out how to operate the actuators to derive desired combustion conditions of the engine and finding the combustion conditions in relation to the output conditions of the engine. This means that the combustion parameters are used as intermediate parameters to obtain the correlations between the engine output-related values and the controlled variables. The simultaneous agreement of the engine output-related values with the required values thereof is, therefore, achieved by calculating target values of the combustion parameters based on required values of the engine output-related values through the combustion parameter arithmetic expression, producing command values for the controlled variables which correspond to the calculated target values through the controlled variable arithmetic expression, and controlling the operations of the actuators through the command values.

The engine control apparatus may further include an engine output feedback control circuit which feeds deviations of actual or calculated values of the engine output-related values from the required values thereof back to calculation of the target values of the combustion parameters. The actual values of the engine output-related values may be measured directly by sensors. The calculated values of the engine output-related values may be derived by models.

The correlations of the combustion conditions (i.e., the combustion parameters) to the output conditions (i.e., engine output-related values) of the engine will change with a change in environmental condition such as the temperature of coolant of the engine or the outside air temperature. The correction of the target values, as derived by the combustion parameter arithmetic expression for each environmental condition, requires the adaptability tests to predetermine amounts by which the target values are to be corrected. This results in an, increase in burden of the adaptability test work and the map-making work on the manufacturers.

In order to avoid the above drawback, the engine control apparatus of the invention calculates the target values of the combustion parameters so as to eliminate the deviations of the actual or calculated values of the engine output-related values from the required values thereof in the feedback mode, so that the target values are derived which accommodate the change in environmental condition. This eliminates the need for the adaptability tests to find the amounts of correction, thus resulting in a decrease in burden of the adaptability test work and the map-making work on the manufacturers.

The engine control apparatus may further include a combustion parameter feedback control circuit which feeds deviations of actual or calculated values of the combustion parameters from the target values thereof back to calculation of the command values for the controlled variables. The actual values of the combustion parameters may be measured directly by sensors. The calculated values of the combustion parameters may be derived by models.

The correlations between the combustion parameters and the controlled variables which show how to operate the actuators to meet desired combustion conditions of the engine will change with a change in environmental condition such as the temperature of coolant of the engine or the outside air temperature. The correction of the command values, as derived by the controlled variable arithmetic expression for each environmental condition, requires the adaptability tests to predetermine amounts by which the command values are to be corrected. This results in an increase in burden of the adaptability test work and the map-making work on the manufacturers.

In order to avoid the above drawback, the engine control apparatus calculates the command values for the controlled variables so as to eliminate the deviations of the actual or calculated values of the combustion parameters from the target values thereof in the feedback mode, so that the command values are derived which accommodate the change in environmental condition. This eliminates the need for the adaptability tests to find the amounts of correction, thus resulting in a decrease in burden of the adaptability test work and the map-making work on the manufacturers.

For example, the air-related combustion parameter is at least one of the quantity of air in the cylinder of the engine, the concentration of oxygen ($O_2$) in the cylinder of the engine, the temperature in the cylinder of the engine, the pressure in the cylinder of the engine, etc. Such sir-related combustion parameters change slightly depending upon the condition of fuel injected into the engine, but are heavily dependent upon the condition of air in the engine.

For example, the fuel injection-related combustion parameters are an ignition timing and an ignition delay that is the time required between when the fuel starts to be sprayed and when the fuel starts to be ignited, etc. Such fuel injection-related combustion parameters change slightly depending upon the condition of sir in the engine, but axe heavily dependent upon the condition of fuel injected into the engine.

The engine output-related values represent at least two of a physical quantity associated with an exhaust emission from the internal combustion engine, a physical quantity associated with an output torque of the internal combustion engine, a physical quantity associated with a fuel consumption, and a physical quantity associated with combustion noise of the internal combustion engine.

For instance, the physical quantity associated with the exhaust emission is the amount of NOx, the amount of PM, the amount of CO, or the amount of HC. The physical quantity associated with the output torque of the engine is the torque outputted from the engine itself or the speed of the engine. The physical quantity associated with the combustion noise is a combustion noise itself or mechanical vibrations of the engine. Such various kinds of physical quantities may be exemplified as the engine output-related values and broken down roughly into the exhaust emission, the output torque, the fuel consumption, and the combustion noise. These four kinds of engine output-related values are disposed to interfere with each other. The engine control apparatus is, therefore, very effective in treating such engine output-related values.

The engine output-related values may also include at least two of the amount of NOx, the amount of PM, the amount of CO, and the amount of HC. The engine output-related values associated with such exhaust emissions are more likely to have the tradeoff relationship. The engine control apparatus is, therefore, effective in treating such engine output-related values.

The controlled variables may include at least two of the injection quantity of fuel, the injection timing of fuel, the number of injections of fuel, the supply pressure of fuel, the EGR amount, the supercharging pressure, and the open/close timing of intake or exhaust valve. Such controlled variables are typical variables used in the engine control system and more likely to interfere mutually with each other. The use of the controlled variable arithmetic expression, therefore, minimizes the mutual interference between such controlled variables.

BRIEF DESCRIPTION OF THE DRAWINGS

The present invention will be understood more fully from the detailed description given hereinbelow and from the accompanying drawings of the preferred embodiments of the invention, which, however, should not be taken to limit the invention to the specific embodiments but are for the purpose of explanation and understanding only.

In the drawings:

FIG. 1(*b*) is an illustration which represents a determinant used as a combustion parameter arithmetic expression;

FIG. 1(*c*) is an illustration which represents a determinant used as a controlled variable arithmetic expression;

FIG. 3(*b*) is an illustration which exemplifies the correlation, as defined by the controlled variable arithmetic expression of FIG. 3(*a*);

FIG. 3(*c*) is an illustration which exemplifies the correlation, as defined by the combustion parameter arithmetic expression of FIG. 3(*a*);

FIG. 5(*b*) is a view which exemplifies a change in temperature of coolant of an internal combustion engine;

FIG. 5(*c*) is a view which exemplifies changes in combustion parameters;

FIG. 5(*d*) is a view which exemplifies changes in engine output-related values FIGS. 6(*a*) and 6(*b*) are timing charts which demonstrate changes in required value of engine output-related values;

FIG. 6(*d*) is a timing chart which represents a change in target value of a fuel injection-related combustion parameter;

FIG. 7(*b*) is a view which illustrates a modification of correction of fuel injection-related combustion parameter;

DESCRIPTION OF THE PREFERRED EMBODIMENTS

Figures 1A, 1B, 1C:
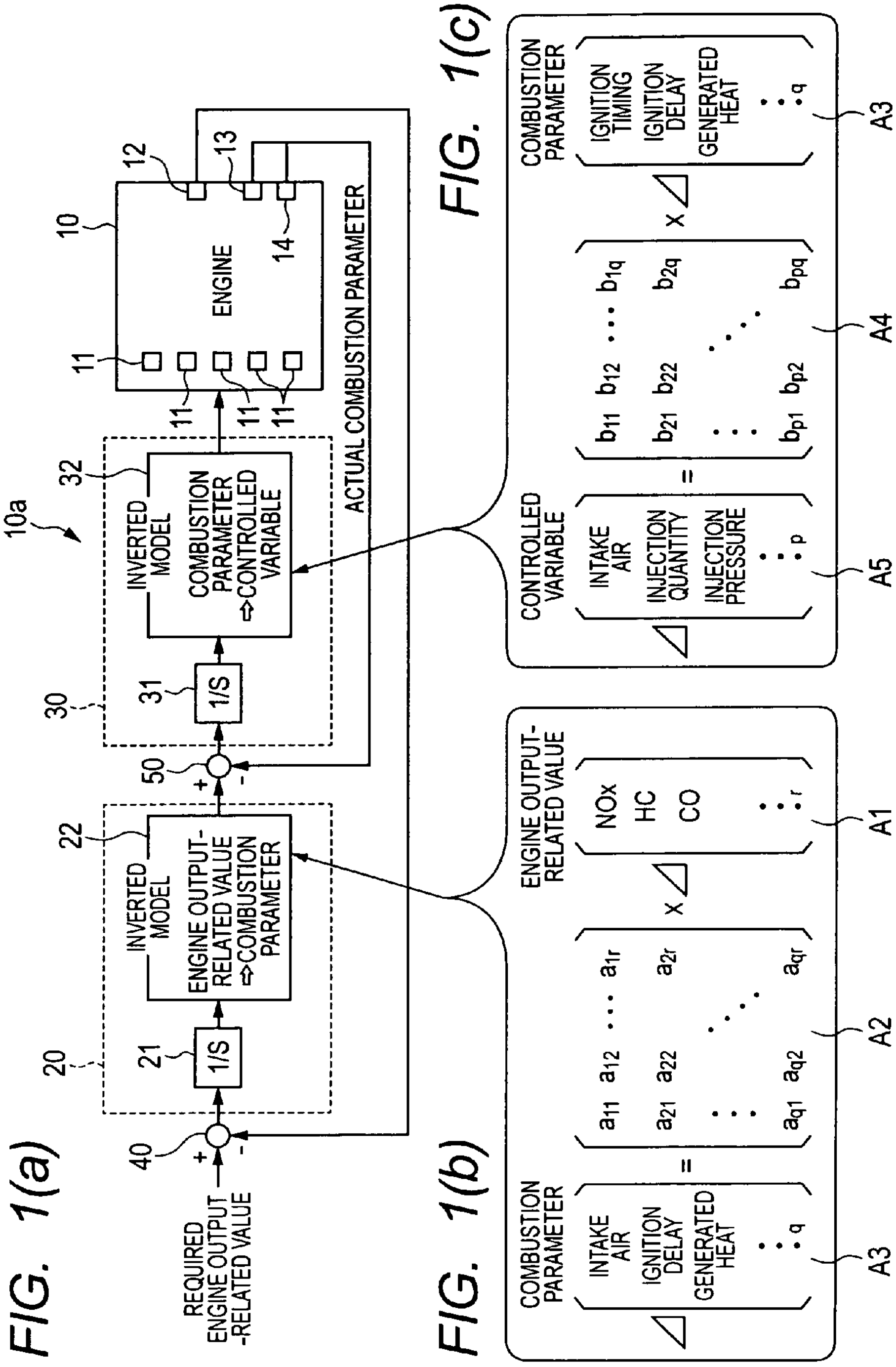
FIG. 1(*a*) is a block diagram which shows an engine control system according to the first embodiment.

Referring to the drawings, wherein like reference numbers refer to like parts in several views, particularly to FIG. 1(*a*), there is shown an engine control system according to the first embodiment which is designed to control an operation of an internal combustion engine 10 for automotive vehicles. The following discussion will refer to, as an example, a self-ignition diesel engine in which fuel is sprayed into four cylinders #1 to #4 at a high pressure.

FIG. 1(*a*) is a block diagram of the engine control system implemented by an electronic control unit (ECU) 10*a* which works to control operations of a plurality of actuators 11 to regulate fuel combustion conditions of the engine 10 for bringing output characteristics of the engine 10 into agreement with desired ones.

The actuators 11 installed in a fuel system are, for example, fuel injectors which spray fuel into the engine 10 and a high-pressure pump which controls the pressure of fuel to be fed to the fuel injectors. The ECU 10*a* works to calculate a command value representing a target controlled variable, i.e., a target amount of fuel to be sucked and discharged by the high-pressure pump and output it in the form of a command signal to the high-pressure pump to control the pressure of fuel to be sprayed into the engine 10. The ECU 10*a* also determines command values representing target controlled variables, i.e., a target quantity of fuel to be sprayed from each of the fuel injectors (i.e., an injection duration), a target injection timing at which each of the fuel injectors is to start to spray the fuel, and the number of times each of the fuel injectors is to spray the fuel in each engine operating cycle (i.e., a four-stroke cycle) including intake or induction, compression, combustion, and exhaust and output them in the form of command signals to the fuel injectors.

The actuators 11 installed in an inlet system are, for example, an EGR (Exhaust Gas Recirculation) valve which controls the amount of a portion of exhaust gas emitted from the engine 10 to be returned back to an inlet port of the engine 10 (which will also be referred to as an EGR amount below), an operation of a variably-controlled supercharger which regulates the supercharging pressure variably, an operation of a throttle valve which controls the quantity of fresh air to be inducted into the cylinder of the engine 10, and an operation of a valve control mechanism which sets open and close timings of intake and exhaust valves of the engine 10 and regulates the amount of lift of the take and exhaust valves. The ECU 10*a* works to calculate command values representing target controlled variables, i.e., target values of the EGR amount, the supercharging pressure, the quantity of fresh air, the open and close timings, and the amount of lift of the intake and exhaust valves and output them in the form of command signals to the EGR valve, the variably-controlled supercharger, the throttle valve, and the valve control mechanism, respectively.

In the way as described above, the ECU 10*a* controls the operations of the actuators 11 to achieve the target controlled variables, thereby controlling the combustion condition in the engine 10 to bring the output characteristics of the engine 10 into agreement with desired ones.

The combustion conditions of the engine 10, as referred to above, are defined by a plurality of types of combustion parameters. The combustion parameters are broken down into a plurality of fuel injection-related combustion parameters which change heavily depending upon a condition of injection of fuel into the cylinder of the engine 10 and at least one air-related combustion parameter which changes heavily depending upon a condition of air in the cylinder of the engine 10.

For example, the fuel injection-related combustion parameters are an ignition timing and an ignition delay that is the time required between when the fuel starts to be sprayed and when the fuel starts to be ignited, etc. Such fuel injection-related combustion parameters are physical quantities which are usually measured by, for example, a cylinder pressure sensor 13 which measures the pressure in the cylinder of the engine 10.

The air-related combustion parameter is at least one of the quantity of air in the cylinder of the engine 10, the concentration of oxygen ($O_2$) in the cylinder of the engine 10, the pressure in the cylinder of the engine 10, etc. The quantity of air in the cylinder is a physical quantity which is measurable by an air-flow meter working as a combustion condition sensor 14. The concentration of oxygen in the cylinder is measurable by a typical oxygen sensor working as the combustion condition sensor 14.

The controlled variables are also broken down into fuel injection-related controlled variables which greatly affect the condition of injection of fuel into the cylinder of the engine 10 and at least one air-related controlled variable which greatly affects the condition of air in the cylinder of the engine 10. For example, the fuel injection-related controlled variables are the pressure of fuel, the quantity of fuel to be sprayed into the engine 10, the injection timing, and the number of times each of the fuel injectors is to spray the fuel in each engine operating cycle, as described above. The air-related controlled variable is at least one of the EGR amount, the supercharging pressure, the quantity of air to be fed into the engine 10, the open and close timings of the intake and exhaust valves of the engine 10, and the amount of lift of the intake and exhaust valves.

The output characteristics of the engine 10, as referred to above, are expressed by a plurality of types of engine output-related values that are ones of, for example, a physical quantity associated with exhaust emissions (e.g., the amount of NOx, the amount of PM (Particulate Matter), and the amount of CO or HC), a physical quantity associated with torque outputted from the engine 10 (e.g., the torque of an output shaft of the engine 10) and the speed of the engine 10, a physical quantity associated with a fuel consumption in the engine 10 (e.g., a travel distance per consumed volume of fuel or a consumed volume per running time of the engine 10, as measured through mode running tests, and a physical quantity associated with combustion noise (e.g., engine vibrations or combustion or exhaust noises.

The ECU 10*a* is equipped with a typical microcomputer including a CPU performing operations on given tasks, a RAM serving as a main memory storing therein data produced during the operations of the CPU or results of the operations of the CPU, a ROM serving as a program memory, an EEPROM storing data therein, and a backup RAM to which electric power is supplied at all the time from a backup power supply such as a storage battery mounted in the vehicle even after a main electric power source of the ECU 10*a* is turned off.

The engine 10 has installed therein the sensors 12, 13, and 14 which provide outputs to the ECU 10*a*. The sensors 12 are engine output sensors functioning as a portion of an engine output-related value feedback circuit to measure the engine output-related values actually. For example, the engine output sensors 12 are implemented by a gas sensor which measures the concentration of a component (e.g., NOx) of exhaust emissions from the engine 10, a torque sensor which measures the torque outputted by the engine 10, and a noise sensor which measures the magnitude of noise arising from the combustion of fuel in the engine 10. As will be described later, the actual values of the engine output-related values may alternatively be calculated or estimated using algorithmic models without use of the sensor 12.

The sensors 13 and 14 are combustion condition sensors serving as a portion of a combustion parameter feedback circuit to determine the above described combustion parameters actually. For example, the sensor 13 is, as described above, implemented by the cylinder pressure sensor which measures the pressure in the combustion chamber (i.e., the cylinder) of the engine 10 or an ion sensor which measures the quantity of ion, as produced by the burning of fuel in the engine 10. For example, the ECU 10*a* calculates a change in pressure in the combustion chamber of the engine 10, as measured by the cylinder pressure sensor 13, to determine both the ignition timing and the ignition delay. The actual values of the combustion parameters may alternatively be calculated or estimated using an algorithmic model without use of the sensors 13.

The ECU 10*a* includes a combustion parameter calculator 20, a combustion parameter controller 30, an engine output deviation calculator 40, and a combustion parameter deviation calculator 50. The combustion parameter calculator 20 serves as a combustion target value calculator to determine the combustion conditions of the engine 10 (i.e., the combustion parameters) needed to bring the engine output-related values into agreement with required ones. The combustion parameter controller 30 serves as a controlled variable command calculator to control the operations (i.e., the controlled variables) of the actuators 11 to achieve target combustion conditions of the engine 10. The engine output deviation calculator 40 serves as an engine output feedback circuit to calculate a difference or deviation of an actual value of each of the engine output-related values (i.e., the outputs from the engine output sensors 12) from a required value thereof. The combustion parameter deviation calculator 50 serves as a combustion parameter feedback circuit to calculate a difference or deviation of an actual value of each of the combustion parameters (i.e., the outputs from the combustion condition sensors 13 and 14) from a target value thereof. These circuits 20 to 50 are implemented by function blocks in the microcomputer of the ECU 10*a*.

Specifically, the combustion parameter calculator 20 has an integrator 21 and a combustion parameter arithmetic expression 22. The integrator 21 works to sum or totalize each of the engine output deviations, as calculated by the engine output deviation calculator 40. The combustion parameter arithmetic expression 22 is stored in a memory such as the ROM of the ECU 10*a*.

The combustion parameter arithmetic expression 22 is made to define correlations between the different types of engine output-related values and the different types of combustion parameters. Specifically, the combustion parameter arithmetic expression 22 is provided by an engine output-to-combustion parameter model, as illustrated in FIG. 1(*a*), or a determinant, as illustrated in FIG. 1(*b*), and to mathematically express relations of the combustion conditions of the engine 10 (i.e., the combustion parameters) to the output conditions of the engine 10 (i.e., the engine output-related values). In other words, the combustion parameter arithmetic expression 22 produces values of the combustion conditions of the engine 10 needed to meet the required values of the engine output-related values. Target values of the combustion parameters (or amounts by which the target values, as derived in the previous control cycle, are required to be changed) are obtained by substituting required values of the engine output-related values (or the deviations of the actual values from the required values) into the combustion parameter arithmetic expression 22.

The combustion parameter calculator 20 having the structure of FIG. 1(*a*) substitutes the deviations of the engine output-related values (i.e., differences between the actual values of the engine output-related values from the required values thereof) into the combustion parameter arithmetic expression 22 to determine amounts by which the target values of the combustion parameters, as set in the previous control cycle, are required to be changed in this control cycle.

In practice, the integrator 21 totalizes the deviations of the actual, values of the engine output-related values, respectively and substitutes them into the combustion parameter arithmetic expression 22 to minimize the possibility that the actual values of the engine output-related values will deviate from the required values thereof constantly. When the total value of the deviation becomes zero (0), a corresponding value, as calculated by the combustion parameter arithmetic expression 22, will be zero. The target values of the combustion parameters are, therefore, so set as to keep the combustion conditions of the engine 10 as they are.

The combustion parameter controller 30 includes an integrator 31 and a controlled variable arithmetic expression 32. The integrator 31 works to sum or totalize the deviation of the actual value of each of the combustion parameters from the target value thereof, as derived by the combustion parameter deviation calculator 50. The controlled variable arithmetic expression 32 is stored in a memory (i.e., a storage device) such as the ROM of the ECU 10*a*.

The controlled variable arithmetic expression 32 is made to define correlations between the different types of combustion parameters and the different types of controlled variables. The controlled variable arithmetic expression 32 is provided by a combustion parameter-to-controlled variable model, as illustrated in FIG. 1(*a*), or a determinant, as illustrated in FIG. 1(*c*) and mathematically express values of the controlled variables corresponding to desired combustion conditions of the engine 10. In other words, the controlled variable arithmetic expression 32 provides a combination of values of the controlled variables needed to place the engine 10 in target combustion conditions. The command values for the controlled variables (or amounts by which the command values are to be changed) are, therefore, obtained by substituting target values of the combustion parameters (or amounts by which the target values are to be changed) into the combustion parameter arithmetic expression 32.

The combustion parameter deviation calculator 30 of the structure of FIG. 1(*a*) substitutes the combustion parameter deviations (i.e., the amounts by which the target values are required to be changed) into the controlled variable arithmetic expression 32 to determine amounts by which the command values, as derived in the previous control cycle, are needed to be changed in this control cycle in order to derive amounts by which the controlled variables provided in the previous control cycle are required to be changed in this control cycle.

In practice, the integrator 31 integrates or totalizes the deviations of the actual values of the combustion parameters from the target values thereof, as derived by the combustion parameter deviation calculator 50 and substitutes them into the controlled variable arithmetic expression 32, respectively, to minimize the possibility that the actual values of the combustion parameters will deviate from the target values thereof constantly. When the total value of each of the deviations becomes zero (0), a corresponding value, as calculated by the controlled variable arithmetic expression 32, will be zero. The command value for each of the controlled variables is, therefore, so set as to keep the latest value of the controlled variable as it is.

Figure 2:
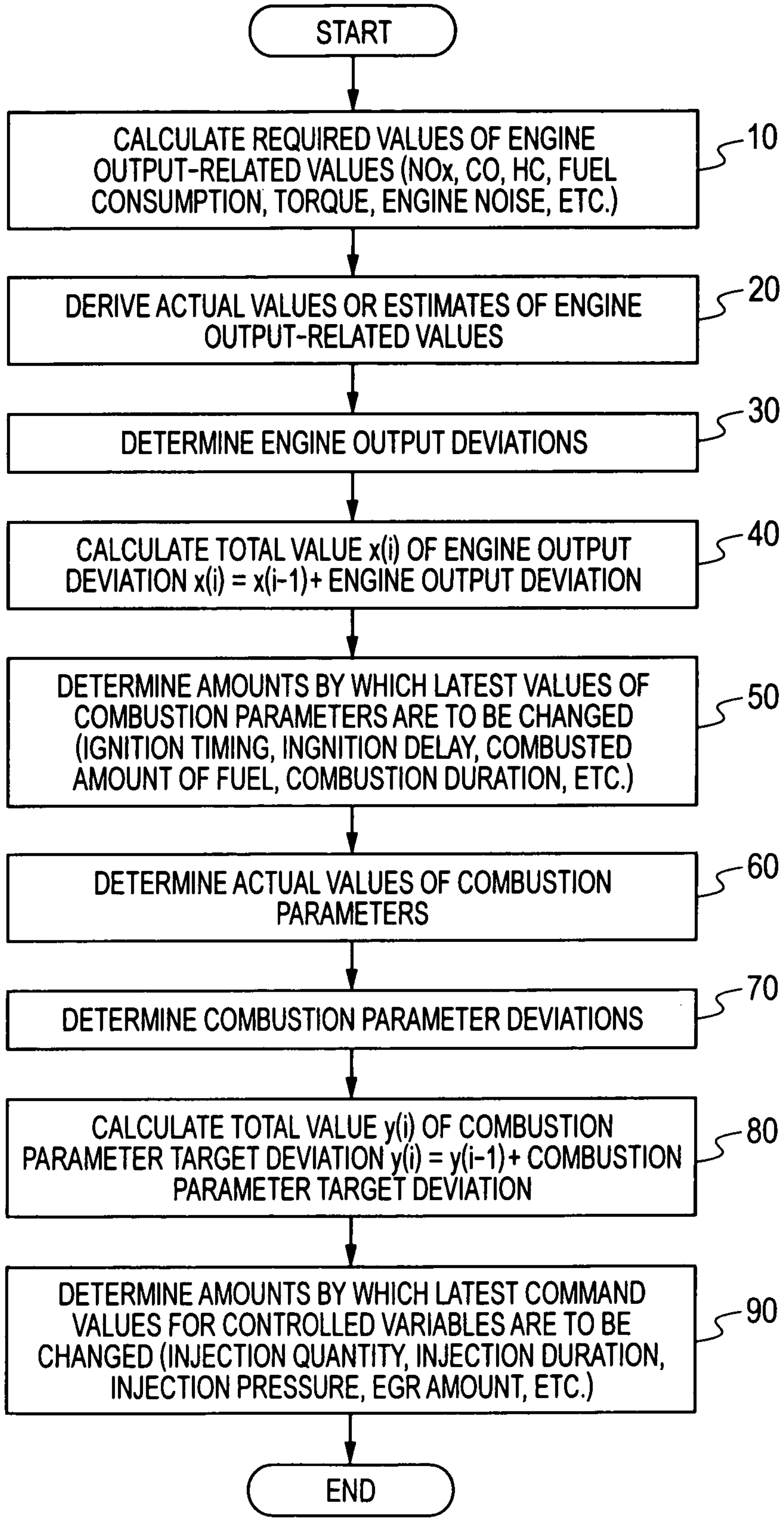
FIG. 2 is a flowchart of an engine control program to be executed by the engine control system of FIG. 1(*a*)

How to calculate the command values to be outputted to the actuators 11 to achieve desired values of the controlled variables thereof will be described below with reference to a flowchart of an actuator control program, as illustrated in FIG. 2. This program is to be executed by the microcomputer of the ECU 10*a* at a regular interval (e.g., an operation cycle of the CPU or a cycle equivalent to a given crank angle of the engine 10).

After entering the program, the routine proceeds to step 10 wherein required values of the respective engine output-related values are calculated based on the speed of the engine 10 and the position of the accelerator pedal of the vehicle (i.e., a driver's effort on the accelerator pedal). For example, the ECU 10*a* calculates the required values using a map which is made by the adaptability tests and stores therein optimum values of the engine output-related values in relation to speeds of the engine 10 and positions of the accelerator pedal. The ECU 10*a* may also determine the required values of the engine output-related values as a function of an additional environmental condition or parameter(s) such as the temperature of cooling water for the engine 10, the outside air temperature, and/or the atmospheric pressure.

The routine proceeds to step 20 wherein actual values of the respective engine output-related values are measured from outputs of the engine output sensors 12. The ECU 10*a* may alternatively be designed to estimate or calculate the current engine output-related values through arithmetic models and determine them as the above actual values without use of the engine output sensors 12. Such estimation may be made only on some of the engine output-related values.

The routine proceeds to step 30 wherein the operation of the engine output deviation calculator 40 is executed. Specifically, deviations of the actual values of the engine output-related values measured in step 20 from the required values thereof derived in step 10 are determined. Such deviations will also be referred to as engine output deviations below.

The routine proceeds to step 40 wherein the operation of the integrator 21 is executed. Specifically, a total value x(i) of each of the engine output deviations, as derived in step 30, is determined. More specifically, the sum of each of the total values x(i−1), as derived one program execution cycle earlier, and a corresponding one of the engine output deviations, as derived in this program execution cycle, is calculated as the total value x(i).

The routine proceeds to step 50 wherein the total values x(i), as derived in step 40, are substituted into the combustion parameter arithmetic expression 22. Solutions of the combustion parameter arithmetic expression 22 are determined as amounts by which the current or latest values of the combustion parameters are required to be changed. For instance, the combustion parameter arithmetic expression 22, as illustrated in FIG. 1(*b*), is so designed that the product of an r-order column vector A1 of variables representing amounts by which the current values of the engine output-related values are to be changed and a matrix A2 made up of q-by-r elements art to $a_{11}$ is defined as a q-order column vector A3 of variables representing amount by which the combustion parameters are to be changed. The total values x(i) of the deviations, as derived in step 40, are substituted into the variables of the column vector A1 to derive solutions of the respective variables (i.e., entries) of the column vector A3. The solutions are determined as amounts by which the latest values of the combustion parameters are needed to be changed to achieve target values thereof derived in this program execution cycle (which will also be referred to as combustion parameter target changes below).

The routine proceeds to step 60 wherein outputs of the combustion condition sensors 13 and 14 are monitored to derive actual values of the combustion parameters. The ECU 10*a* may alternatively calculate or estimate current values of the combustion parameters through arithmetic models and determine them as the above actual values without use of the combustion condition sensor 13 or 14. Such estimation may be made only on some of the combustion parameters.

The routine proceeds to step 70 wherein the operation of the combustion parameter deviation calculator 50 is performed. Specifically, each of the combustion parameter target changes, as derived in step 50, is added to a reference value thereof to determine a target value. Next, a deviation of each of the target values from a corresponding one of the actual values of the combustion parameters, as derived in step 60, is calculated. Alternatively, a deviation of each of the combustion parameter target changes from a change in actual value of a corresponding one of the combustion parameters may be computed.

The routine proceeds to step 80 wherein the operation of the integrator 31 is performed. Specifically, a total value y(i) of each of the combustion parameter target deviations, as derived in step 70, is determined. More specifically, the sum of the total value y(i−1), as derived one program execution cycle earlier, and the combustion parameter target deviation, as derived in this program execution cycle, is calculated as the total value y(i).

The routine proceeds to step 90 wherein a fuel injection-related controlled variable correction is performed. Specifically, the total values y(i), as derived in step 80, are substituted into the controlled variable arithmetic expression 32. Solutions of the controlled variable arithmetic expression 32 are determined as amounts by which the latest command values for the all types of controlled variables are needed to be changed or regulated. For instance, the controlled variable arithmetic expression 32, as illustrated in FIG. 1(*c*), is so designed that the product of an q-order column vector A3 of variables representing the combustion parameter target changes and a matrix A4 made up of p-by-q elements b11 to bpq is defined as a p-order column vector A5 of variables representing amount by which the controlled variables are to be changed. The total values y(i) of the deviations, as derived in step 80, are substituted into the variables of the column vector A3 to derive solutions of the respective variables (i.e., entries) of the column vector A5. The solutions are determined as amounts by which the latest values of the controlled variables are to be changed to achieve target values thereof (i.e., target command values) derived in this program execution cycle (which will also be referred to as controlled variable target changes below).

The ECU 10*a* also calculates reference command values representing reference values of the controlled variables in addition to the operation in FIG. 2. The ECU 10*a* then corrects the reference command values based on the controlled variable target changes, as derived in step 90, to produce the command values to be outputted directly to the actuators 11, respectively. The reference command values may be predetermined as a function of an engine operating condition such as the speed of the engine 10 or calculated in the ECU 10*a* according to a mathematical formula or by look-up using a map based on the engine operating condition. The map is, unlike those taught in Japanese Patent First Publication Nos. 2008-223643 and 2007-77935 referred to in the introductory part of this application, made to provide only the reference command values and thus easy to make with fewer adaptability tests.

Examples of the correlations between the engine output-related values and the combustion parameters and between the combustion parameters and the controlled variables, as defined by the combustion parameter arithmetic expression 22 and the controlled variable arithmetic expression 32, will be described below with reference to FIGS. 3(*a*) to 3(*c*).

Figures 3A, 3B, 3C:
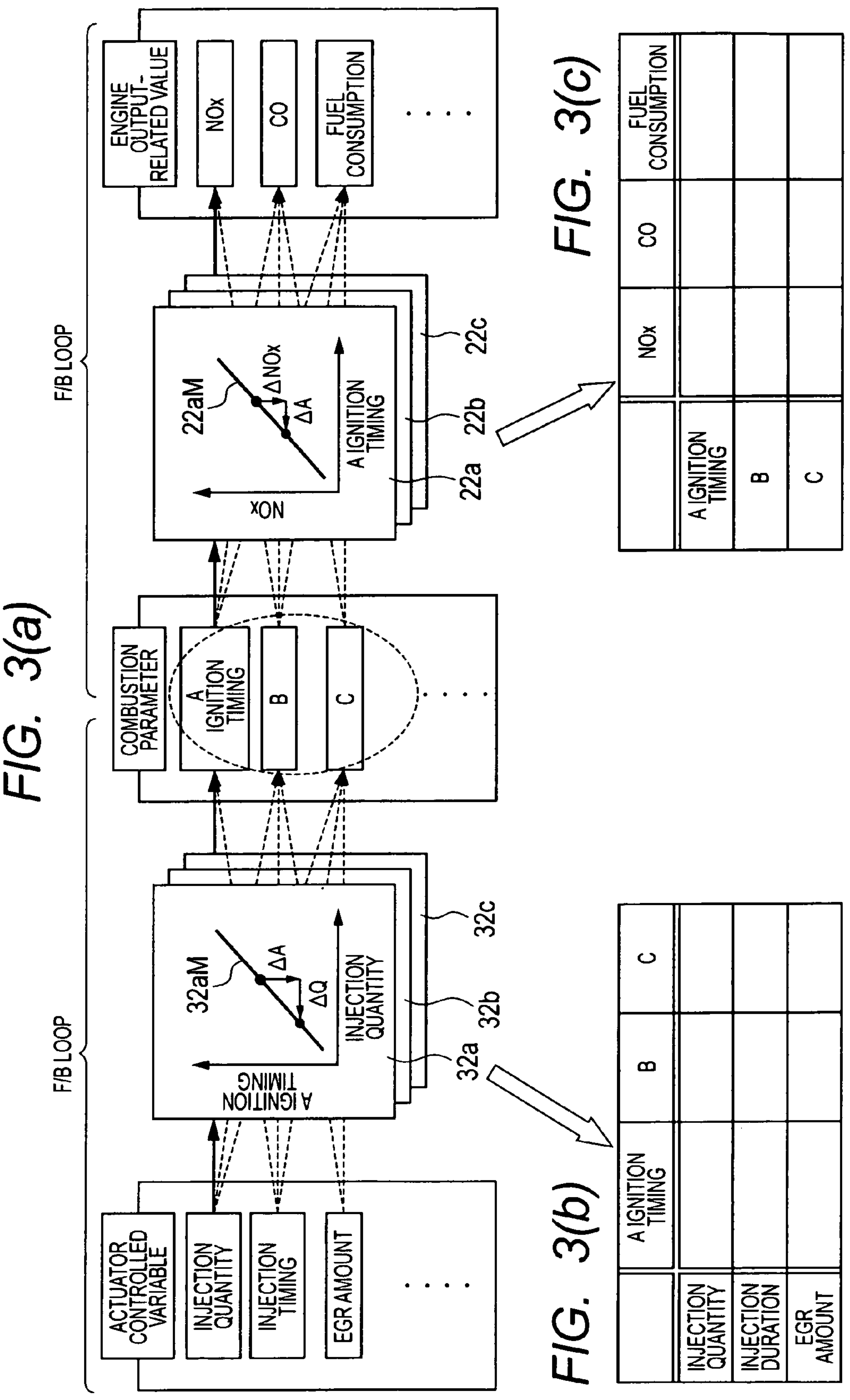
FIG. 3(*a*) is an explanatory view which illustrates correlations, as defined by the combustion parameter arithmetic expression and the controlled variable arithmetic expression in FIGS. 1(*a*) to 1(*c*)

FIG. 3(*a*) illustrates the above correlations schematically. The injection quantity, the injection duration, and the EGR amount are defined as the controlled variables of the actuators 11. The amount of NOx, the amount of CO, and the fuel consumption are defined as the engine output-related values. "A", "B", and "C" represent the different types of combustion parameters, respectively. For instance, "A" indicates the ignition timing in the engine 10.

In the example of FIG. 3(*a*), reference number 32*a* denotes a regression line 32*a*M which represents a correlation between the injection quantity and the combustion parameter A. The regression line 32*a*M is set up by, for example, the multiple regression analysis. Similarly, reference number 32*b* denotes a regression line which represents a correlation between the injection quantity and the combustion parameter B. Reference number 32*c* denotes a regression line which represents a correlation between the injection quantity and the combustion parameter C. Specifically, the correlation, as illustrated in FIG. 3(*b*), between each of the injection quantity, the injection tuning, and the EGR amount and one of the combustion parameters A, B, and C is defined by the regression line through the model or the determinant, as described above. Therefore, when combinations of values of the injection quantity, the injection timing, and the EGR amount are specified, corresponding combinations of values of the combustion parameters A, B, and C are obtained. In other words, relations of the controlled variables to the combustion conditions of the engine 10 (i.e., the combustion parameters) are defined. The controlled variable arithmetic expression 32 is, as can be seen in FIG. 1(*a*), defined by a model inverse of that in FIG. 3(*a*).

In FIG. 3(*a*), reference number 22*a* denotes a regression line 22*cM* which represents a correlation between the combustion parameter A and the amount of NOx. The regression line 22*a*M is set up by, for example, multiple regression analysis. Similarly, reference number 22*b* denotes a regression line which represents a correlation between the combustion parameter A and the amount of CO. Reference number 22*c* denotes a regression line which represents a correlation between the combustion parameter A and the fuel consumption. Specifically, the correlation, as illustrated in FIG. 3(*c*), between each of the combustion parameters A, B, and C and one of the amount of NOx, the amount of CO, and the fuel consumption is defined by the regression line through the model or the determinant, as described above. Therefore, when combinations of the combustion parameters A, B, and C are specified, corresponding combinations of the amount of NOx, the amount of CO, and the fuel consumption are obtained. In other words, relations of the combustion conditions of the engine 10 (i.e., the combustion parameters) to the output conditions of the engine 10 (i.e., the engine output-related values) are defined. The combustion parameter arithmetic expression 22 is, as can be seen in FIG. 1(*a*), defined by a model inverse of that in FIG. 3(*a*).

For example, when the target value of the ignition timing A remains unchanged, but the actual value thereof has changed, this difference (i.e., the combustion parameter deviation) is given by the combustion parameter deviation calculator 50. The combustion parameter controller 30 substitutes such a combustion parameter deviation into the model, as indicated in FIG. 3(*b*), or the determinant to derive amounts (i.e., correction values) by which the current values of the injection quantity, the injection timing, and the EGR amount are to be changed or corrected to bring the actual value of the ignition timing A into agreement with the target value thereof.

Taking as an example a correction value ΔQ of the injection quantity (i.e., the amount by which the injection quantity is to be changed), the combustion parameter controller 30 derives the correction value ΔQ which corresponds to a target change ΔA in the ignition timing A based on the regression line 32*a*M in FIG. 3(*a*). The controlled variable arithmetic expression 32 in FIG. 3(*b*) defines the combinations of the combustion parameters and the controlled variables, so that when only one of the combustion parameters has changed from the target value, all the controlled variables are corrected simultaneously.

Similarly, when the required value of the amount of NOx remains unchanged, but the actual value thereof has changed, this difference (i.e., the engine output deviation) is derived by the engine output deviation calculator 20. The combustion parameter calculator 20 substitutes such an engine output deviation into the model, as indicated in FIG. 3(*c*), or the determinant to derive amounts (i.e., correction values) by which the current values of the combustion parameters A, B, and C are to be changed or corrected to bring the actual value of the amount of NOx into agreement with the required value thereof.

Taking as an example a correction value ΔA of the ignition timing (i.e., the amount by which the ignition timing is to be changed), the combustion parameter calculator 20 derives the correction value ΔA which corresponds to a target change ΔNOx in the amount of NOx from the regression line 22*a*M in FIG. 3(*a*). The combustion parameter arithmetic expression 22 in FIG. 3(*c*) defines the combinations of the engine output-related values and the combustion parameters, so that when only one of the engine output-related values has changed from the required value thereof, the target values of all the combustion parameters are corrected simultaneously.

The combustion parameter arithmetic expression 22, as described already, defines the combinations of the engine output-related values and the combustion parameters, thus enabling changes in the respective engine output-related values in response to a change in one of the combustion parameters to be figured out. For instance, when actual values of the amount of NOx and the amount of PM deviate from required values thereof, respectively, as demonstrated in FIG. 4, such deviations are eliminated by changing the latest value of the ignition timing A1 (i.e., the value, as derived one program execution cycle earlier) to the value A2. Even if the value of the ignition timing A needed to bring the amount of NOx and the amount of PM just into agreement with the required values thereof is not found, optimum values which bring both the amount of NOx and the amount of PM as closer to the required values, respectively, as possible may be derived by the combustion parameter arithmetic expression 22.

Figure 4:
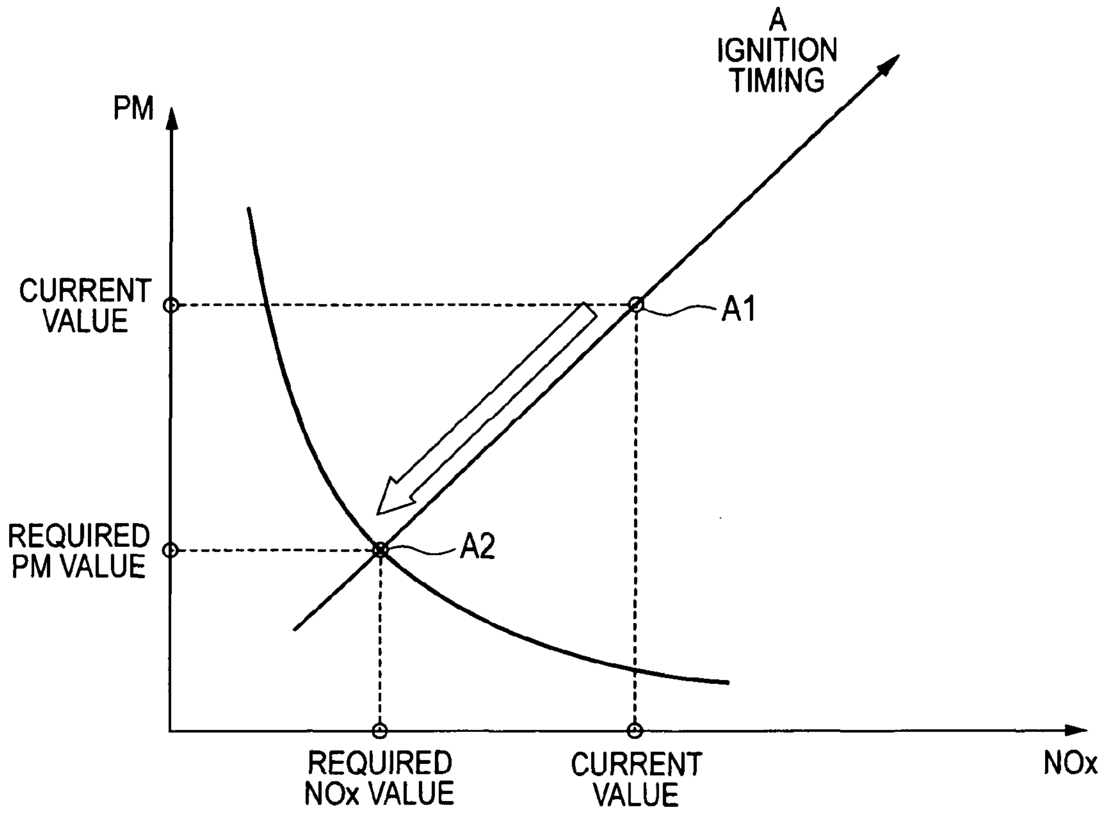
FIG. 4 is an explanatory view which represents effects of a combustion parameter on engine output-related values.
Figure 5A:
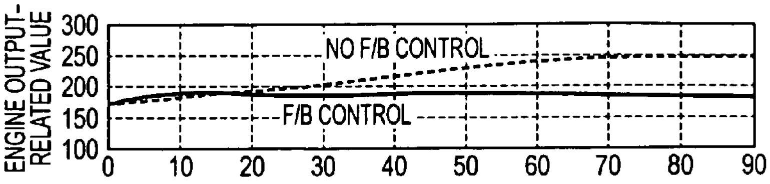
FIG. 5(*a*) is a view which exemplifies a change in engine output-related value.
Figure 5B:
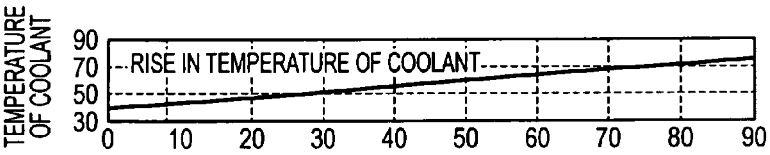
Figure 5C:
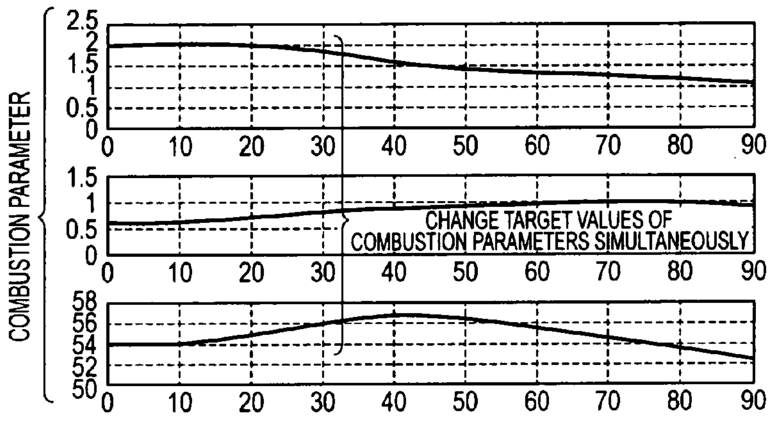
Figure 5D:
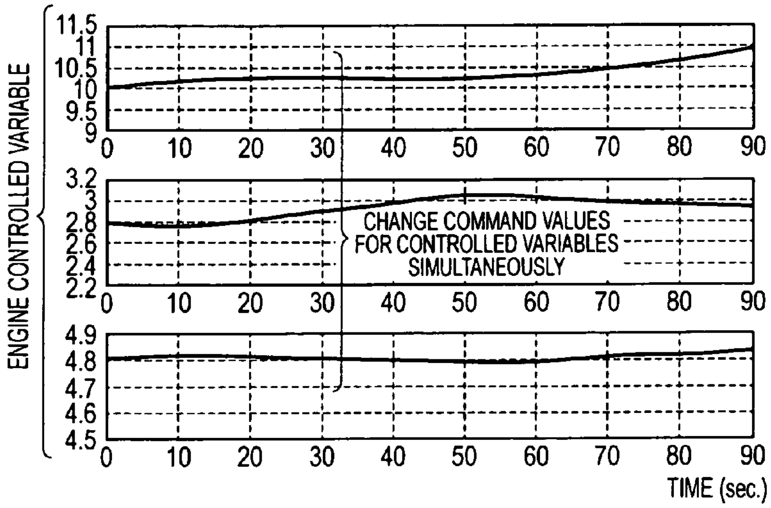
Figure 6A:
FIG. 6(*c*) is a timing chart which represents a change in target value of an air-related combustion parameter.
Figure 6B:
Figure 6C:
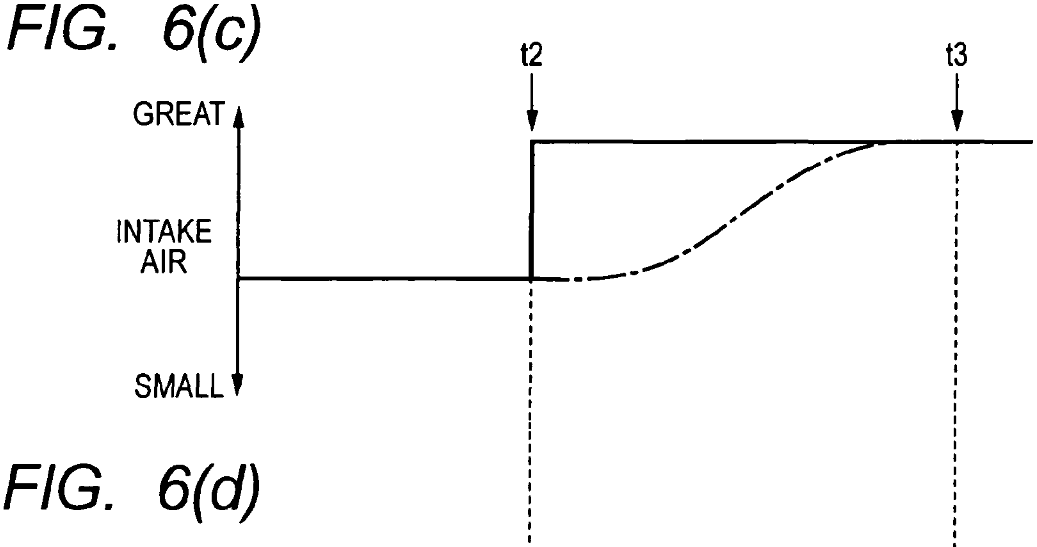
Figure 6D:
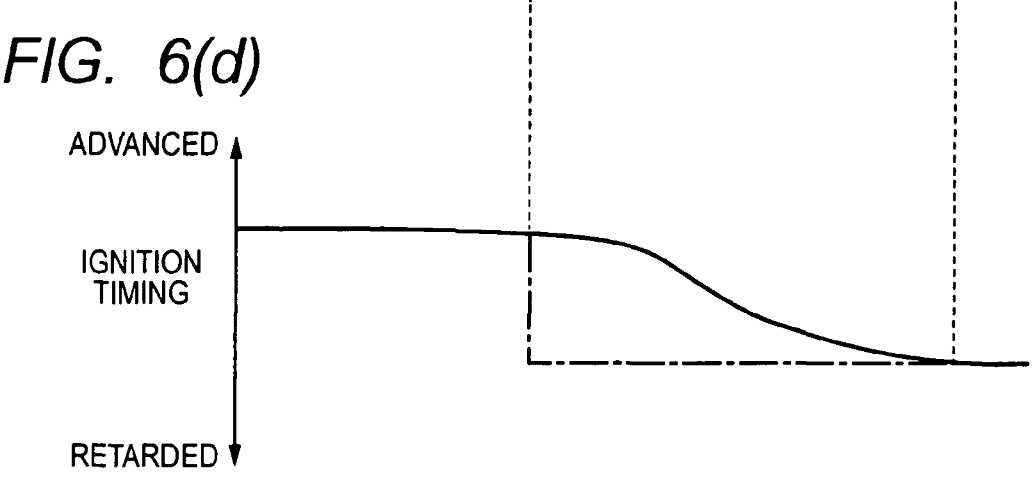

FIG. 4 is a schematic view which demonstrates the correction of only the ignition timing A for the sake of convenience, but however, the combustion parameter arithmetic expression 22 is, as described above, provided to define a given number of all possible combinations of the different types of engine output-related values and the different types of combustion parameters, thus causing the target values of the combustion parameters to be corrected simultaneously in response to one or some of the deviations of the engine output-related values.

Like the combustion parameter arithmetic expression 22, the controlled variable arithmetic expression 32 is prepared to define a given number or all possible combinations of the different types of combustion parameters and the different types of controlled variables, thus causing the command values for the controlled parameters to be corrected simultaneously in response to one or some of the deviations of the combustion parameters.

FIGS. 5(*a*) to 5(*d*) are timing diagrams which demonstrate results of simulations of operations of the engine control system of this embodiment when the temperature of cooling water (i.e., an environmental condition) for the engine 10 has changed during a steady operation of the engine 10.

When the temperature of cooling water is, as illustrated in FIG. 5(*b*), increased gradually, it will cause the combustion conditions of the engine 10 to change even if the controlled variables remain unchanged. The combustion parameter deviation calculator 50 then outputs the combustion parameter deviations. The engine control system changes the current values of the controlled variables in the feedback mode so as to minimize or eliminate the combustion parameter deviations, as derived by the combustion parameter deviation calculator 50. In the illustrated example, the engine control system corrects, as illustrated in FIG. 5(*d*), the current values of the controlled variables simultaneously in response to the change in temperature of cooling water, so that the operations of the actuators 11 are controlled simultaneously in a coordinated way to minimize the combustion parameter deviations as a whole.

Additionally, when the temperature of cooling water is increased gradually, it will also cause the engine output-related values to change even if the combustion conditions of the engine 10 remain unchanged. The engine output deviation calculator 40 then outputs the engine output deviations. The engine control system changes the target values of the combustion parameters in the feedback mode so as to minimize or eliminate the engine output deviations, as derived by the engine output deviation calculator 40. In the illustrated example, the engine control system corrects, as illustrated in FIG. 5(*c*), the target values of the different types of combustion parameters simultaneously in a coordinated way in response to the change in temperature of cooling water to minimize the engine output deviations as a whole.

In short, the engine control system, as illustrated in FIGS. 5(*d*) and 5(*c*), regulates the controlled variables simultaneously and also regulates the combustion parameters simultaneously in the feedback mode to bring the engine output-related value, as indicated by a solid line in FIG. 5(*a*), into agreement with a fixed value. In the case where the engine control system is designed not to perform the above feedback control, for example, to perform open-loop control using an adaptability test-made map representing one-to-one correspondences between the different types of engine output-related values and the different types of controlled variables, the engine output-related value changes, as indicated by a broken line in FIG. 5(*a*), in response to a change in temperature of cooling water for the engine 10. The results of the simulations in FIGS. 5(*a*) to 5(*d*) show that the above feedback control in this embodiment improves the robustness of the engine control system.

The calculation of the command values for the controlled variables in the manner, as described in FIG. 2, faces the following problem, especially during the transient operation of the engine 10. The response of a change in actual value of the air-related combustion parameter (e.g., the quantity of the intake air to be inducted into the engine 10) to a change in target value thereof is slower than that of the fuel injection-related combustion parameter (e.g., the ignition timing). Thus, when a most recently measured value of the air-related combustion parameter is decided in error to have already agreed with a latest target value thereof, as derived in the previous control cycle, in calculation of a target value of the air-related combustion parameter through the combustion parameter arithmetic expression 22 for use in this control cycle, it may lead to great deviations of actual values of the engine output-related values from required values thereof.

In order to alleviate the above problem, the engine control system of this embodiment is designed to perform a transient correction mode to change the target values of the fuel injection-related combustion parameters at a slow rate that is selected as a function of lag in response of the actual value of one or some of the air-related combustion parameters to a change in target value thereof.

FIGS. 6(*a*) to 6(*d*) are timing charts which demonstrate an example of the transient correction mode. Of course, the correction of the target values of the fuel injection-related combustion parameters may be made other than the transient operation mode of the engine 10. FIGS. 6(*a*) and 6(*b*) represent changes in required value of the engine output-related values (i.e., the amount of smoke emitted from the engine 10 and the level of combustion noise). FIG. 6(*c*) represents a change in target value of the air-related combustion parameter (i.e., the amount of intake air inducted into the engine 10), FIG. 6(*d*) represents a change in target value of the fuel injection-related combustion parameter (i.e., the ignition timing).

When the required values of the amount of smoke and the level of combustion noise drop, as illustrated in FIGS. 6(*a*) and 6(*b*), stepwise at time t1, the ECU 10*a* detects deviations of actual values of the amount of smoke and the level of the combustion noise from the required values (i.e., the engine output deviations), then increases the amount of intake air, and retards the ignition timing so as to minimize the engine output deviations. Specifically, the ECU 10*a* increases a target value of the amount of intake air (i.e., an amount by which the latest target value of the amount of intake air is to be changed) to be calculated by the combustion parameter arithmetic expression 22 stepwise at time t2 (see a solid line in FIG. 6(*c*)). Additionally, the ECU 10*a* also retards a target value of the ignition timing (i.e., an amount by which the latest target value of the ignition timing is to be changed) to be calculated by the combustion parameter arithmetic expression 22 stepwise at time t2 (see a solid line in FIG. 6(*d*)).

However, the amount of intake air actually inducted into the engine 10 starts to change gradually, as indicated by a dashed line in FIG. 6(*c*), after a lag time following the stepwise change in the target value. In contrast, the ignition timing generally changes almost simultaneously with the change in target value thereof. In other words, the ignition timing changes stepwise upon the stepwise change in target value thereof. Accordingly, when the ECU 10*a* decides in error that the actually induced amount of intake air has reached the target value thereof, and then starts to calculate a target value of the ignition timing, it will cause the ignition timing to be retarded to the target value even though the actually induced amount of intake air has not yet reached the target value. The actual ignition timing will, thus, be over-retarded for the actually induced amount of intake air, thus resulting in instability of combustion of fuel in the engine 10, leading to deterioration of emissions from the engine 10, as the case may be, misfires in the engine 10.

The engine control system of this embodiment is, as described above, designed to change or correct the target value of the ignition timing, as indicated by the solid line in FIG. 6(*d*), at a slow rate as a function of the delay in response of induction of intake air into the engine 10 to a change in target value thereof. At time t3 when the response delay in the induction of intake air becomes zero (0), the ECU 10*a* sets the amount by which the ignition timing is to be corrected to zero (0).

An example of the above transient correction of the fuel injection-related combustion parameter (i.e., fuel injection-related combustion parameter correction) will be described below. This correction is made in step 50 of FIG. 2.

Figure 7A:
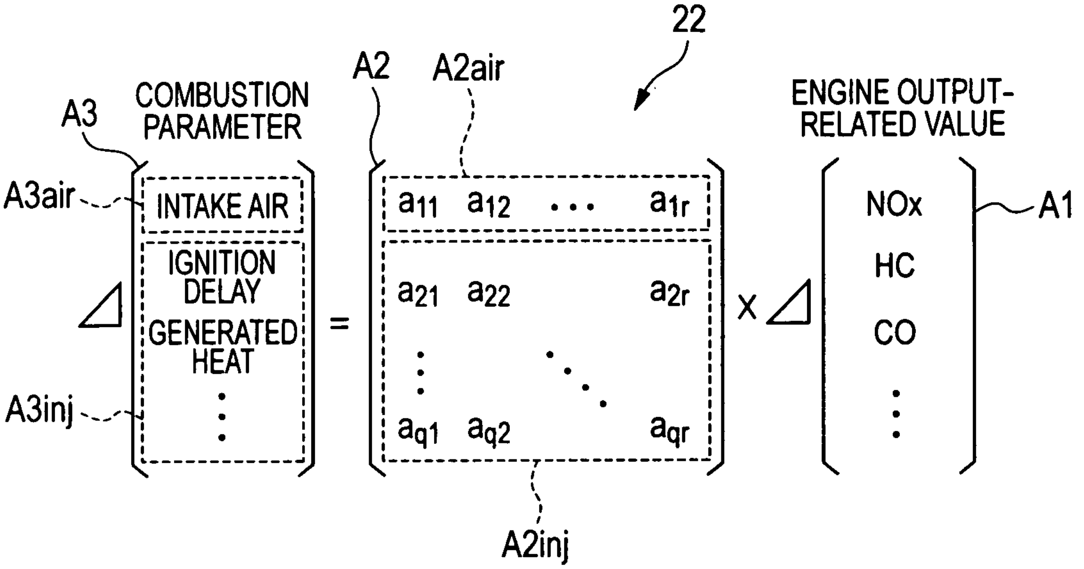
FIG. 7(*a*) is a view which illustrates a combustion parameter arithmetic expression of FIG. 1(*b*) in detail to correct fuel injection-related combustion parameters in the first embodiment.
Figure 7B:
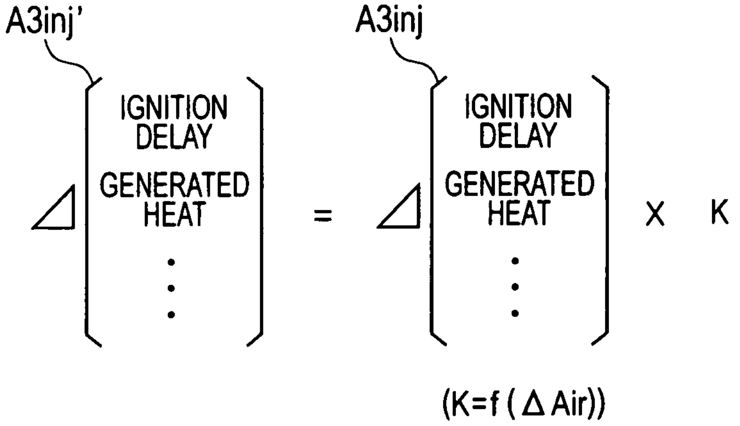

FIG. 7(*a*) illustrates the combustion parameter arithmetic expression 22 in FIG. 1(*b*).

The column vector A3 is formed by a combination of an air-related column vector A3*air* containing a selected one of the air-related combustion parameters and a fuel injection-related column vector A3*inj* containing the fuel injection-related combustion parameters. The air-related column vector A3*air* may alternatively include the two or more air-related combustion parameters. The matrix A2 is made up of an air-related matrix A2*air* defining correlations between the air-related column vector A3*air* and the engine output-related values and a fuel injection-related matrix A2*inj* defining correlations between the fuel injection-related column vector A3*inj* and the engine output-related values.

The combustion parameter calculator 20 determines a correction factor K as a function of a delay in response of a change in actual value of the one of the air-related combustion parameters (e.g., the amount of intake air inducted into the engine 10) to a change in target value thereof and multiplies the fuel injection-related column vector A2*inj* by the correction factor K to correct the fuel injection-related column vector A3*inj*. The correction factor K may be determined as a function of the response delays of actual values of the two or more air-related combustion parameters. Alternatively, the combustion parameter calculator 20, as illustrated in FIG. 7(*b*), may work to multiply the fuel injection-related vector A3*inj*, as derived using the fuel injection-related column vector A2*inj*, by the correction factor K to produce a fuel injection-related column vector A3*inj'*.

In short, the engine control system of this embodiment corrects target values of all the fuel injection-related combustion parameters using the single correction factor K. For instance, the combustion parameter calculator 20 may select the correction factor K from between zero (0) and one (1) (i.e., $0<K<1$) to smooth changes in target values of the fuel injection-related combustion parameters along the solid line in FIG. 6(*d*). It is preferable that the correction factor K is decreased with an increase in response delay of the air-related combustion parameter and set to zero (0) at the time when the response delay becomes zero (0).

For example, the response delay in change in amount of intake air inducted into the engine 10 may be determined by a deviation of a target value of the amount of intake air, as calculated through the combustion parameter arithmetic expression 22, from an actual value thereof, as measured by the air flow meter 14.

The engine control system of this embodiment offers the following advantages.

1) The engine control system works to correct target values of the fuel injection-related combustion parameters as a function of the response delay of at least one of the air-related combustion parameters, thereby bringing actual values of the fuel injection-related combustion parameters into agreement with desired values matching the one of the air-related combustion parameter now undergoing the response delay. This minimizes deviations of actual values of the engine output-related values from required values thereof during the transient operation of the engine 10.

2) The same correction factor K is used to correct the target values of all the fuel injection-related combustion parameters, thus resulting in a decrease in load on calculation of amounts by which the fuel injection-related combustion parameters are to be corrected as compared with when correction amounts are determined one for each of the fuel injection-related combustion parameters.

3) The combustion parameter arithmetic expression 22 is designed to define the correlations between the different types of engine output-related values and the different types of combustion parameters, thereby figuring out how to control the combustion conditions of the engine 10 to achieve the required engine output-related values. Specifically, the engine control system works to determine a combination of target values of the combustion parameters through the combustion parameter arithmetic expression 22 so as to minimize the deviations of actual values of the engine output-related values from required values thereof and realize the required engine output-related values in view of the fact that the different types of combustion parameters mutually interfere with one of the engine output-related values. This results in improvement in bringing the engine output-related values closer to the required values simultaneously.

4) The controlled variable arithmetic expression 32 is designed to define the correlations between the different types of combustion parameters and the different types of controlled variables, thereby figuring out how to control the combustion conditions of the engine 10 to achieve desired output conditions of the engine 10. Specifically, the engine control system works to determine a combination of the controlled variables through the controlled variable arithmetic expression 32 so as to minimize the deviations of actual values of the combustion parameters from target values thereof, thereby avoiding the deterioration of engine controllability arising from the mutual interference of the different types of controlled variables with one of the combustion parameters. This results in improvement in bringing the combustion parameters closer to the target values simultaneously.

5) The engine control system, as described above, has the combustion parameter arithmetic expression 22 and the controlled variable arithmetic expression 32 for use in selecting a combination of target values of the combustion parameters required to achieve required values of the engine output-related values and a combination of command values for the controlled variables needed to achieve target values of the combustion parameters, thereby eliminating the adaptability tests to find optimum values of such combinations, respectively, which results in a reduction in burden of the adaptability test work and the map-making work on the control system manufacturer and also permits the capacity of the memory needed to store the maps in the ECU 10*a* to be decreased.

Particularly, the acquisition of optimum values of the above combinations for each of the environmental conditions through the adaptability tests usually results in a great increase in number of the adaptability tests. The engine control system of this embodiment, however, improves the robustness against a change in environmental condition, as already discussed in FIGS. 5(*a*) to 5(*d*), through the feedback control, as described below in 4) and 5), thus eliminating the need for preparing the combustion parameter arithmetic expression 22 and the controlled variable arithmetic expression 32 for each of the environmental conditions, which also reduces the burden on the control system manufacturers.

6) The engine control system sets the controlled variables of the actuators 11 simultaneously in the coordinated manner so as to bring actual or calculated values of the control parameters into agreement with target values thereof in the feedback modes, thereby minimizing deviations of the different types of combustion conditions of the engine 10 from target conditions which arise from a change in environmental condition such as the temperature of cooling water for the engine 10. This improves the robustness of the combustion parameter controller 30 against the change in environmental condition in controlling the combustion conditions of the engine 10.

7) The engine control system sets the target values of the different types of combustion parameters simultaneously in the coordinated manner so as to bring actual or calculated values of the engine output-related values into agreement with required values thereof in the feedback modes, thereby minimizing deviations of the different types of engine output-related values from the target values which arise from a change in environmental condition such as the temperature of cooling water for the engine 10. This improves the robustness of the combustion parameter calculator 20 against the change in environmental condition in calculating the target values of the combustion parameters needed to meet the required values of the engine output-related values.

8) The improvement of the robustness against a change in environmental condition eliminates the need for reflecting the environmental condition, as measured by, for example, a coolant temperature sensor, in controlling the engine 10. This permits one or more environmental condition sensors to be omitted.

9) Usually, it is very complicated to define the correlations between the different types of engine output-related values and the different types of controlled variables of the actuators 11 directly. In other words, it is very difficult to find the regression lines 32*a*M, as illustrated in FIG. 3(*a*), experimentally. It is, however, relatively easy to obtain the correlations between the engine output-related values and the combustion parameters and between the combustion parameters and the controlled variables of the actuators 11. In light of this fact, the engine control system of this embodiment uses the combustion parameter arithmetic expression 22 and the controlled variable arithmetic expression 32 to define the correlations between the engine output-related values and the controlled variables through the combustion parameters as intermediate parameters, thereby facilitating the ease of acquiring data on the regression lines 22*a*M and 32*a*M used in making the combustion parameter arithmetic expression 22 and the controlled variable arithmetic expression 32.

10) The engine control system works to control the actual or calculated values of the engine output-related values in the feedback mode where the combustion parameters are employed as the intermediate parameters and also to control actual or calculated values of the intermediate parameters (i.e., the combustion parameters) in the feedback mode, thus resulting in improved robustness against a change in environmental condition in controlling the engine 10 through the combustion parameter controller 30 and the combustion parameter calculator 20.

11) If one of the actuators 11 has failed to operate properly, so that it has become impossible to change a corresponding one of the controlled variables, the engine control system controls the actual or calculated values of the combustion parameters in the feedback mode, so that the command values for the controlled variables continue to be corrected until the combustion parameter deviations become zero (0). This causes the other controlled variables for the actuators 11 operating properly to be adjusted in the coordinated manner to bring the actual values of the combustion parameters into agreement with the target values, thereby bringing the engine output-related values close to the required values, respectively.

Figure 8A:
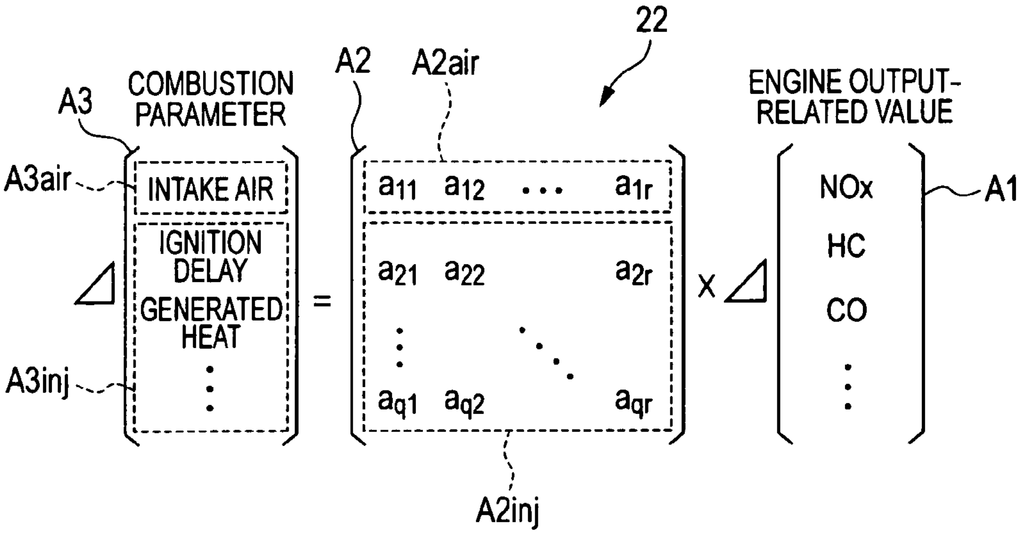
FIGS. 8(*a*) to 8(*c*) illustrate how to correct fuel injection-related combustion parameter according to the second embodiment.
Figure 8B:
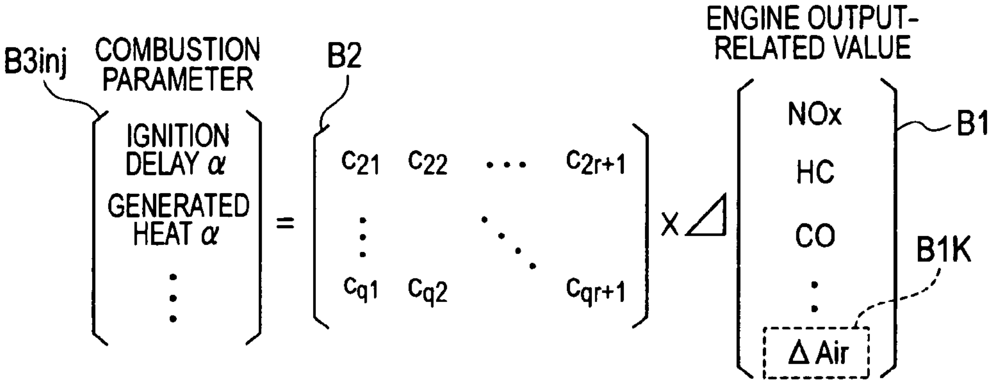
Figure 8C:
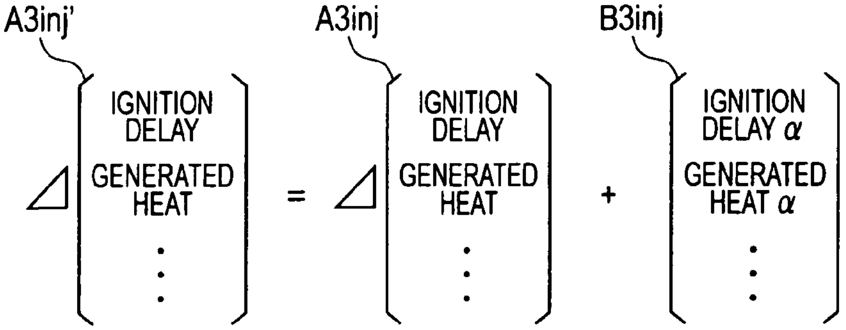

FIGS. 8(*a*) to 8(*c*) illustrate the combustion parameter arithmetic expression 22 according to the second embodiment of the invention in which amounts by which the fuel injection-related combustion parameters are to be corrected are, unlike the first embodiment, prepared one for each of the fuel injection-related combustion parameters.

Correlations between correction amounts that are amounts by which the fuel injection-related combustion parameters are to be corrected, respectively and the response delay of a selected one of the air-related combustion parameters are defined by a fuel injection-related correction arithmetic expression, as shown in FIG. 8(*b*). Like in the first embodiment, the response delays of the two or more air-related combustion parameters may be used in correcting the fuel injection-related combustion parameters.

The fuel injection-related correction arithmetic expression is made up of a column vector B1, a matrix B2, and a column vector B3*inj*. The column vector B1 includes variables representing amounts by which the current values of the engine output-related values are to be changed (i.e., target changes) and a response delay ΔAir. The column vector B3*inj* includes variables representing the correction amounts for the different types of fuel injection-related combustion parameters. The product of the column vector B1 and the matrix B2 is the column vector B3*inj*. The matrix B2 is formed by experimentally-derived entries.

The correction amount for each of the fuel injection-related combustion parameters (i.e., each entry of the column vector B3*inj*) is, therefore, obtained by substituting target changes in required or measured values of the engine output-related values, target changes in the engine output deviations, as calculated by the engine output deviation calculator 40, or target changes in the total values of the engine output deviations, as calculated by the integrator 21 into ones of the variables in the column vector B1 which represent the engine output-related values and also substituting a deviation of a target value of the air-related combustion parameter, as calculated by the combustion parameter arithmetic expression 22, from an actual value thereof, as measured by the combustion condition sensor 14, into one of the variables in the column vector B1 which represents the response delay ΔAir.

The correction of the fuel injection-related column vector A3*inj* is, as illustrated in FIG. 8(*c*), made by adding the column vector B3*inj* (i.e., the correction amounts), as derived by the fuel injection-related correction arithmetic expression of FIG. 8(*b*), to the fuel injection-related column vector A3*inj*, as calculated using the combustion parameter arithmetic expression 22 of FIG. 8(*a*), to produce the fuel injection-related column vector A3*inj'*.

The engine control system of this embodiment uses the fuel injection-related correction arithmetic expression independently of the combustion parameter arithmetic expression 22, thus having the advantage of facilitating the calculation of the correction amounts for the respective fuel injection-related combustion parameters in addition to the beneficial effects, as already described in 1) to 10).

Figure 9:
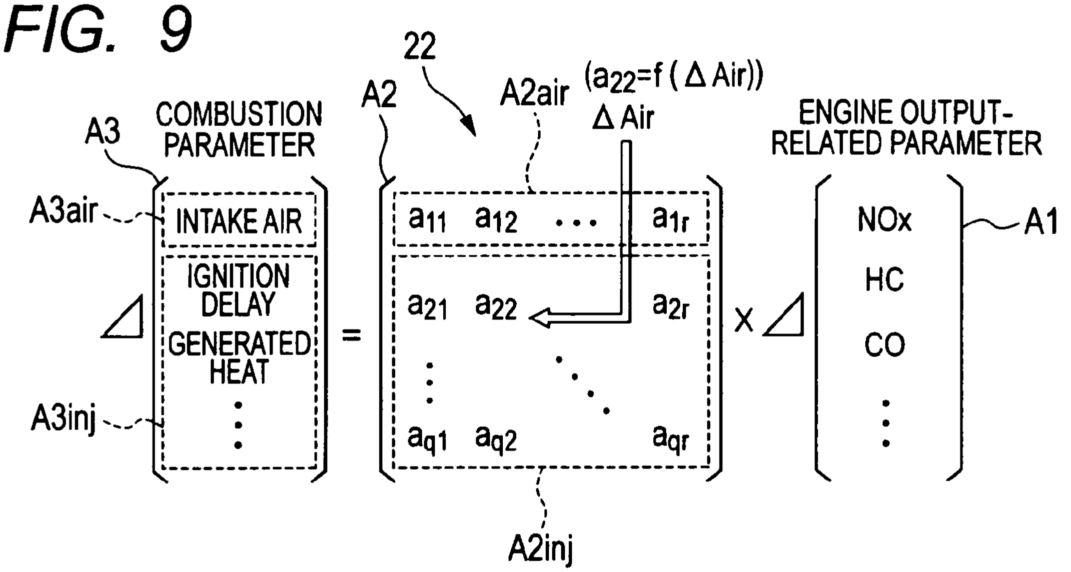
FIG. 9 illustrates how to correct fuel injection-related combustion parameter according to the third embodiment.

FIG. 9 illustrates the combustion parameter arithmetic expression 22 according to the third embodiment of the invention in which the correction of entries of the fuel injection-related column vector A3*inj* in the combustion parameter arithmetic expression 22 is made by correcting the fuel injection-related matrix A2*inj* directly. In the illustrated example, the value $a_{22}$ of the fuel injection-related matrix A2*inj* is corrected as a function of the response delay ΔAir. The engine control system of this embodiment offers the same beneficial effects, as in the second embodiment.

Figure 10:
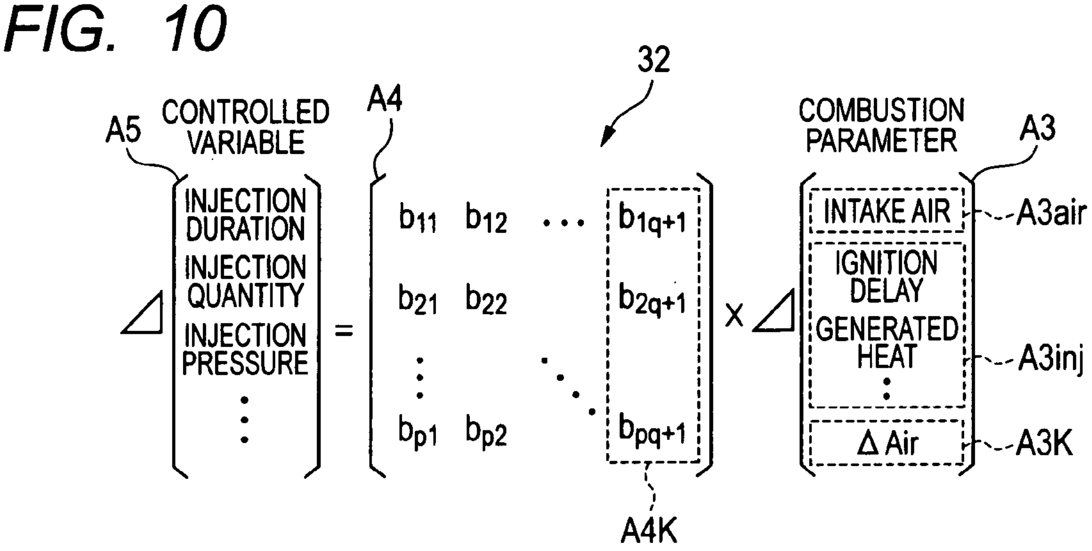
FIG. 10 illustrates how to correct command values of fuel injection-related controlled variables according to the fourth embodiment.

FIG. 10 illustrates the controlled variable arithmetic expression 32 in the fourth embodiment of invention in which the command values for the controlled variables are corrected. This correction is made for fuel injection-related controlled variables, as described below in detail, in step 90 of FIG. 2 by using the controlled variable arithmetic expression 32 of FIG. 10 instead of the one in FIG. 1(*c*).

The controlled variable arithmetic expression 32 of FIG. 10 is made up of a column vector A3 containing variables representing amounts by which current values of the combustion parameters are to be changed (i.e., target changes) and the response delay ΔAir of a selected one of the air-related combustion parameters, a matrix A4, and a column vector A5 containing variables representing amounts by which current values of the controlled variables are to be changed (i.e., target changes). The response delays of the two or more air-related combustion parameters, like in the above embodiments, may alternatively be used. The product of the column vector A3 and the matrix. A4 is the column vector A5. The matrix A4 is formed by experimentally-derived entries. The column vector A3 includes the air-related column vector A3*air* representing the air-related combustion parameter, the fuel injection-related column vector A3*inj* representing the fuel injection-related combustion parameters, and the response delay vector A3K representing the response delay ΔAir. The values A4K in the $(q+1)^{th}$ column of the matrix A4 represent the controlled variable correction arithmetic expression and define correlations between the correction amounts for the different types of controlled variables and the response delay ΔAir.

The values A4K in the $(q+1)^{th}$ column of the matrix A4 are so selected as to smooth the fuel injection-related controlled variables (e.g., the pressure of fuel to be sprayed, the injection quantity, the injection timing, and the number of injections) without changing stepwise. The values A4K may be so determined as to produce correction amounts of zero (0) for the air-related controlled variables (e.g., the EGR amount, the supercharging pressure, the amount of intake air, the open/close timing of the intake and exhaust valves, and the amount of lift of the take and exhaust valves) or as to correct the air-related controlled variables in the same manner as described above.

The engine control system of this embodiment also offers the same beneficial effects, as already described in 1) to 10).

Figure 11:
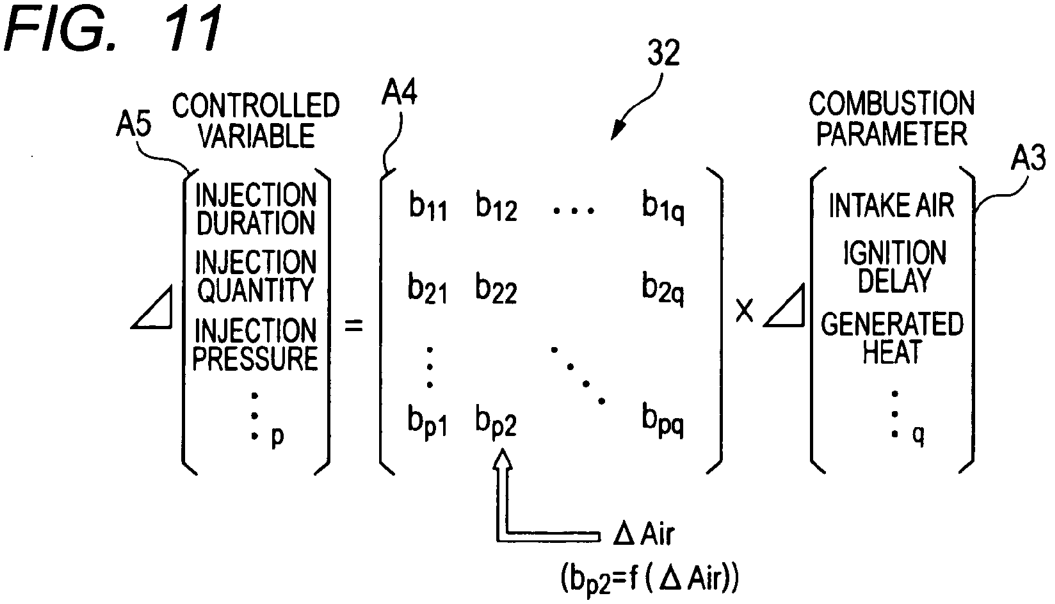
FIG. 11 illustrates how to correct command values of fuel injection-related controlled variables according to the fifth embodiment.

FIG. 11 illustrates the controlled variable arithmetic expression 32 according to the fifth embodiment of the invention. The controlled variable arithmetic expression 32 of the fourth embodiment has the response delay vector A3K which represents the response delayd ΔAir and is incorporated in the column vector A3 to correct the command values for the fuel injection-related controlled variables. In the controlled variable arithmetic expression 32 of FIG. 11, the correction of values of the fuel injection-related controlled variables in the column vector A5 is made by correcting the column vector A4 directly. In the illustrated example, the value $b_{p2}$ of the matrix A4 is corrected as a function of the response delay ΔAir. The engine control system of this embodiment offers the same beneficial effects, as in the fourth embodiment.

Figure 12:
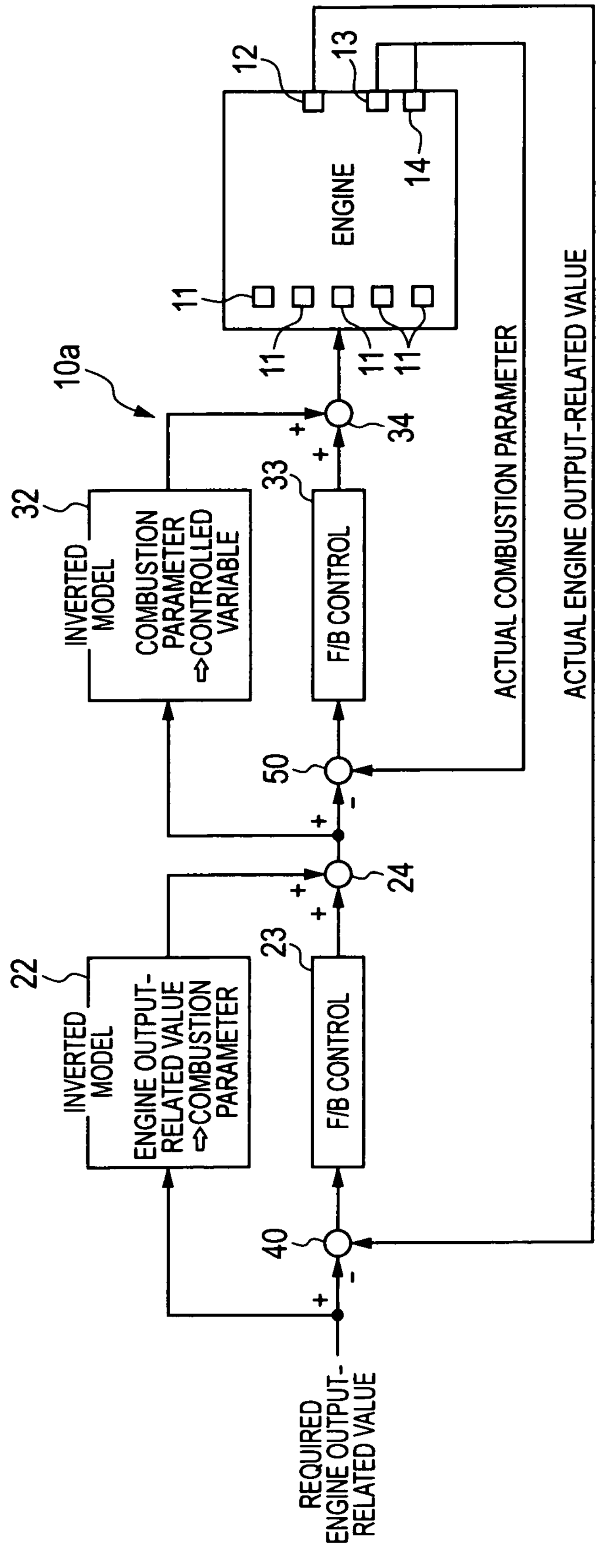
FIG. 12 is a block diagram which shows an engine control system according to the sixth embodiment.

FIG. 12 illustrates an engine control system of the sixth embodiment of the invention.

The engine control system of the first embodiment is designed to calculate the reference command values independently of the control task in FIG. 2 and determine the solutions derived by substituting the combustion parameter deviations into the controlled variable arithmetic expression 32 as amounts by which the reference command values are to be corrected in the feedback mode. In contrast, the engine control system of the sixth embodiment in FIG. 12 determines the solutions derived by substituting the target values of the combustion parameters into the controlled variable arithmetic expression 32 as the reference command values and also calculates amounts by which the reference command values are to be corrected in the feedback mode based on the combustion parameter deviations in a feedback controller 33. The engine control system uses the reference command values, as derived by the controlled variable arithmetic expression 32, and the amounts of correction, as derived by the feedback controller 33, to produce the command values to be outputted directly to the actuators 11 through a command value calculator 34.

The engine control system of the first embodiment calculates the reference target values of the combustion parameters independently of the control task in FIG. 2 and determines the solutions derived by substituting the engine output deviations into the combustion parameter arithmetic expression 22 as amounts by which the reference target values are to be corrected in the feedback mode, in contrast, the engine control system of the sixth embodiment determines the solutions derived by substituting the required values of the engine output related values into the combustion parameter arithmetic expression 22 as the reference target values and calculates amounts by which the reference target values are to be corrected in the feedback mode based on the engine output deviations in the feedback controller 23. The engine control system uses the reference target values, as derived by the combustion parameter arithmetic expression 22, and the amounts of correction, as derived by the feedback controller 23, to produce in a target value calculator 24 the target values of the combustion parameters to be outputted directly to the controlled variable arithmetic expression 32 and the feedback controller 33.

The engine control system of the sixth embodiment serves to control the combustion parameters and the actual or calculated values of the engine output-related values in the same coordinated feedback mode as in the first embodiment.

While the present invention has been disclosed in terms of the preferred embodiments in order to facilitate better understanding thereof, it should be appreciated that the invention can be embodied in various ways without departing from the principle of the invention. Therefore, the invention should be understood to include all possible embodiments and modifications to the shown embodiments which can be embodied without departing from the principle of the invention as set forth in the appended claims.

For instance, the engine control system may be designed to control the actuators 11 in a manner in which some of the features in the first to sixth embodiments are combined.

The engine control system in each of the first to sixth embodiments controls the actual or calculated values of the combustion parameters and the engine output-related values in the feedback mode, however, may alternatively be designed to control at least one of the former and the latter in the open-loop mode. For instance, the feedback controller 23, the target value calculator 24, and the engine output deviation calculator 40, as illustrated in FIG. 12, are omitted. The engine control system outputs the reference target values, as derived by the combustion parameter arithmetic expression 22, directly to the combustion parameter controller 30. Alternatively, the feedback controller 33, the command value calculator 34, and the combustion parameter deviation calculator 50 are omitted. The engine control system outputs the reference command values, as derived by the controlled variable arithmetic expression 32, directly to the actuators 11.

The engine control system in each of the first to sixth embodiments may be constructed to replace either one of the combustion parameter arithmetic expression 22 and the controlled variable arithmetic expression 32 with the following map. A map in which optimum % rallies of the combustion parameters are stored for each of the required values of the engine output-related values may be replaced with the combustion parameter arithmetic expression 22. A map in which optimum values of the controlled variables are stored for each of the target values of the combustion parameters may alternatively be replaced with the controlled variable arithmetic expression 32.

The engine control system may be equipped with a sensor which measures an environmental condition such as the temperature of cooling water or coolant for the engine 10 to correct the target values of the combustion parameters, as calculated by the combustion parameter calculator 20, and/or the command values of the controlled variables, as calculated by the combustion parameter controller 30, based on the measured environmental condition.

What is claimed is:

1. An engine control apparatus which controls operations of actuators to control combustion conditions in an engine, thereby controlling output characteristics of the engine, comprising:

a storage device configured to store therein a combustion parameter arithmetic expression defining correlations between a plurality of types of engine output values representing said output characteristics and a plurality of combustion parameters representing the combustion conditions;

a combustion target value calculator configured to use the combustion parameter arithmetic expression, as stored in said storage device, and required values of the plurality of types of engine output values to calculate combinations of target values of the combustion parameters with required values of the engine output values; and a controlled variable command value calculator configured to calculate command values of controlled variables for the actuators based on the target values of the plurality of types of combustion parameters, as calculated by said combustion target value calculator, wherein the plurality of types of combustion parameters are broken down into fuel injection-related combustion parameters which change greatly depending upon a condition of injection of fuel into a cylinder of the engine and air-related combustion parameters which change greatly depending upon an air condition in the cylinder of the engine, wherein the plurality of types of combustion parameters are made up of an air-related vector representing the air-related combustion parameters and a fuel injection-related vector representing the fuel injection-related combustion parameters, wherein the combustion parameter arithmetic expression includes an air-related matrix defining correlations between the air-related vector and the plurality of types of engine output values and a fuel injection-related matrix defining correlations between the fuel injection-related vector and the plurality of types of engine output values, wherein said storage device stores therein a fuel injection-related correction arithmetic expression including a matrix which defines correlations between correction amounts by which the plurality of types of fuel injection-related combustion parameters are to be corrected, respectively, and delays of response of actual values of the air-related combustion parameters to the target values thereof, and wherein said combustion target value calculator includes a fuel injection-related parameter corrector that adds the correction amounts, as calculated using the fuel injection-related correction arithmetic expression, to the fuel injection-related vector, as calculated using the combustion parameter arithmetic expression, to correct the target values of the fuel injection-related combustion parameters so as to suit the delays of response of the air-related combustion parameters.

2. An engine control apparatus as set forth in claim 1, wherein said storage device also stores therein a controlled variable arithmetic expression defining correlations between the plurality of types of combustion parameters and the plurality of types of controlled variables, and wherein said controlled variable command value calculator calculates combinations of the command values for the controlled variables with the target values of the plurality of types of combustion parameters based on said controlled variable arithmetic expression and the target values of the plurality of types of combustion parameters.

* * * * *